(12) United States Patent
Lee et al.

(10) Patent No.: US 10,394,091 B2
(45) Date of Patent: Aug. 27, 2019

(54) LIQUID CRYSTAL DISPLAY DEVICE

(71) Applicant: SAMSUNG DISPLAY CO., LTD., Yongin-si, Gyeonggi-do (KR)

(72) Inventors: Hyunsup Lee, Hwaseong-si (KR); Junghun Noh, Yongin-si (KR); Keunkyu Song, Seongnam-si (KR); Byungseok Choi, Seoul (KR); Sanghee Jang, Bucheon-si (KR); Hyungil Jeon, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/351,495

(22) Filed: Nov. 15, 2016

(65) Prior Publication Data

US 2017/0139285 A1    May 18, 2017

(30) Foreign Application Priority Data

Nov. 18, 2015  (KR) .................. 10-2015-0161494
Mar. 17, 2016  (KR) .................. 10-2016-0032356

(51) Int. Cl.
  *G02F 1/1335*  (2006.01)
  *G02F 1/1343*  (2006.01)
  *G02F 1/1362*  (2006.01)

(52) U.S. Cl.
  CPC .. *G02F 1/134336* (2013.01); *G02F 1/133514* (2013.01); *G02F 1/136286* (2013.01); *G02F 2201/52* (2013.01)

(58) Field of Classification Search
  CPC ......... G02F 1/134336; G02F 1/133514; G02F 1/136209; G02F 1/136286; G02F 1/1368; G02F 2201/121; G02F 2201/123; G02F 2201/52; G02F 2202/52; G02F 2202/10; G02F 1/134309
  See application file for complete search history.

(56) References Cited

U.S. PATENT DOCUMENTS 6,249,326 B1 *  6/2001  Hebiguchi ........ G02F 1/136213
                                                 349/139
6,741,031 B2 *  5/2004  Harada .................... H01J 11/12
                                                 313/582
7,248,316 B2    7/2007  Park
                    (Continued)

FOREIGN PATENT DOCUMENTS

JP   2009-021222 A   1/2009
KR   2003-0062207 A  7/2003
                    (Continued)

*Primary Examiner* — Nathanael R Briggs
(74) *Attorney, Agent, or Firm* — Lee & Morse, P.C.

(57) ABSTRACT

A liquid crystal display includes a liquid crystal layer between a first substrate and a second substrate, a plurality of gate lines and a plurality of data lines on the first substrate, and a plurality of pixels connected to the plurality of gate lines and the plurality of data lines, the plurality of pixels including a pixel electrode and a switching element connected to the pixel electrode, wherein pixel electrodes in one of an odd-numbered row and an even-numbered row are in odd-numbered columns, respectively, and wherein pixel electrodes in the other of the odd-numbered row and the even numbered row are in even-numbered columns, respectively.

27 Claims, 15 Drawing Sheets

(56) References Cited

U.S. PATENT DOCUMENTS

| | | | |
|---|---|---|---|
| 7,368,868 B2 * | 5/2008 | Sakamoto | H01L 27/3211 |
| | | | 313/500 |
| 8,363,072 B2 | 1/2013 | Hong et al. | |
| 8,411,236 B2 | 4/2013 | Hong | |
| 2002/0125820 A1 | 9/2002 | Sheu et al. | |
| 2007/0146582 A1 * | 6/2007 | Heo | G02F 1/133512 |
| | | | 349/106 |
| 2010/0195027 A1 * | 8/2010 | Yoshida | G02F 1/133707 |
| | | | 349/106 |
| 2014/0307430 A1 * | 10/2014 | Lo | G09F 13/00 |
| | | | 362/231 |
| 2015/0279306 A1 | 10/2015 | Im | |
| 2016/0133173 A1 * | 5/2016 | Tsai | G02F 1/136286 |
| | | | 345/694 |

FOREIGN PATENT DOCUMENTS

| | | |
|---|---|---|
| KR | 10-2004-0106969 A | 12/2004 |
| KR | 10-2007-0080473 A | 8/2007 |
| KR | 10-2011-0083412 A | 7/2011 |
| KR | 10-2015-0005105 A | 1/2015 |

\* cited by examiner

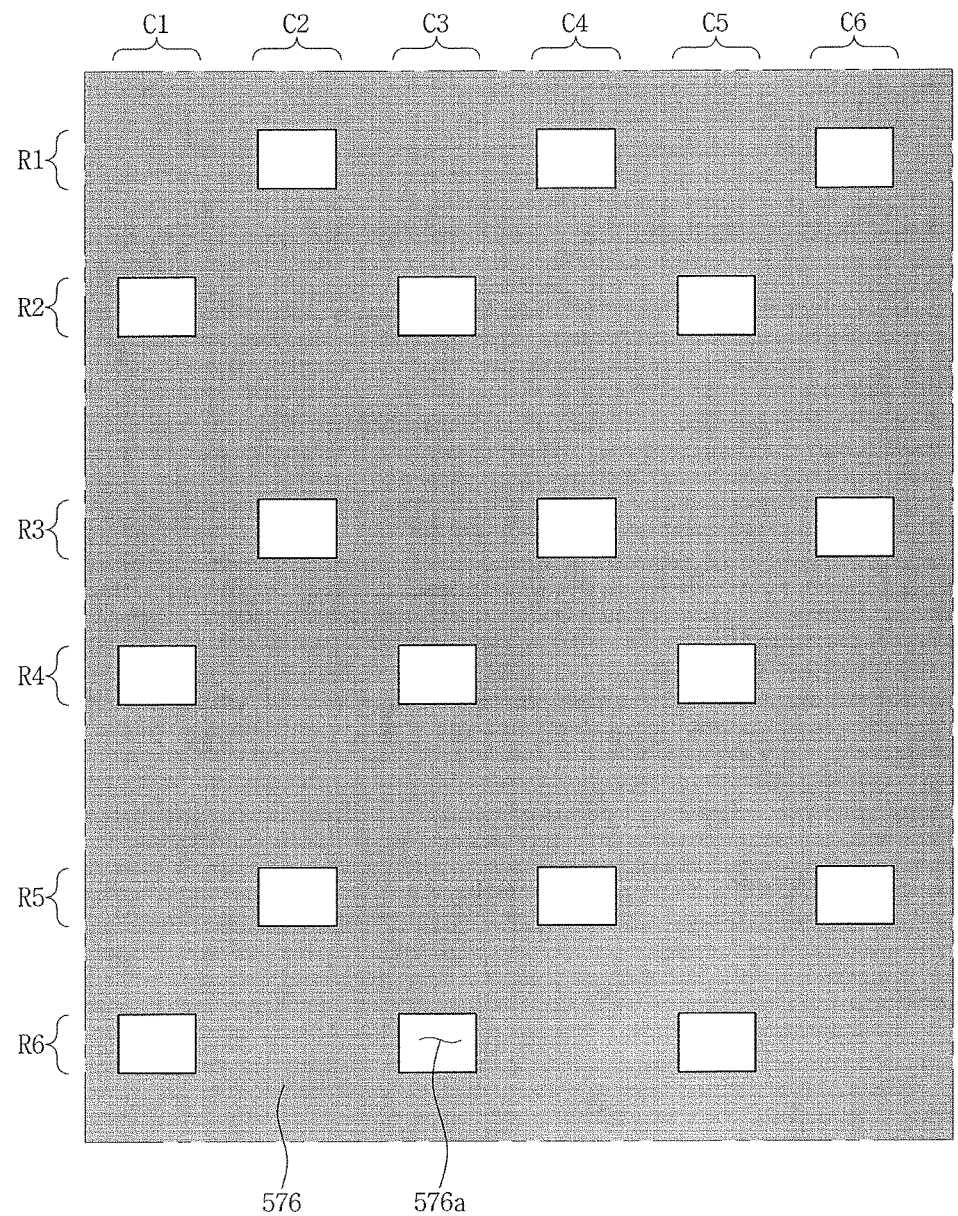

LIQUID CRYSTAL DISPLAY DEVICE

CROSS-REFERENCE TO RELATED APPLICATIONS

Korean Patent Application Nos. 10-2015-0161494, filed on Nov. 18, 2015, and 10-2016-0032356, filed on Mar. 17, 2016, in the Korean Intellectual Property Office, and entitled: "Liquid Crystal Display Device," are incorporated by reference herein in their entirety.

BACKGROUND

1. Field

One or more embodiments described herein relate to a liquid crystal display ("LCD") device.

2. Description of the Related Art

A liquid crystal display ("LCD") device is one of the most widely used types of flat panel display ("FPD") device. An LCD device typically includes two substrates with electrodes disposed thereon, and a liquid crystal layer interposed between the substrates. In such an LCD device, liquid crystal molecules of the liquid crystal layer are realigned by voltages that are applied to the two electrodes, thereby adjusting the amount of light transmitted therethrough and displaying an image on the LCD device.

An LCD device includes a plurality of pixels arranged substantially in a matrix form. As the size of the LCD device increases, a distance between the pixels may decrease. Thus, electric fields respectively generated in adjacent pixels may interfere with one another. In addition, in a case in which a distance between the pixels is significantly small, a liquid crystal molecular movement in one pixel may interfere with a liquid crystal molecular movement in an adjacent pixel. Accordingly, the electric field and the liquid crystal molecular movement in the pixel may be distorted, thereby degrading image quality.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

In accordance with one or more embodiments, a liquid crystal display ("LCD") device includes a liquid crystal layer between a first substrate and a second substrate; a plurality of gate lines and a plurality of data lines on the first substrate; and a plurality of pixels connected to the plurality of gate lines and the plurality of data lines, the plurality of pixels including a pixel electrode and a switching element connected to the pixel electrode, wherein pixel electrodes in one of an odd-numbered row and an even-numbered row are in odd-numbered columns, respectively, and wherein pixel electrodes in the other of the odd-numbered row and the even numbered row are in even-numbered columns, respectively.

A pixel electrode in one row may not be between pixel electrodes in an adjacent row.

The pixel electrodes may include a first pixel electrode in one row, a second pixel electrode in another row and adjacent to the first pixel electrode, and a third pixel electrode in still another row, the third pixel electrode being adjacent to the first pixel electrode and opposing the second pixel electrode, and wherein the first pixel electrode is between imaginary lines extending from opposing sides of the second pixel electrode and the third pixel electrode, respectively.

The pixel electrodes may include a fourth pixel electrode adjacent to the first pixel electrode and the second pixel electrode and in the another row, and the first pixel electrode may be between imaginary lines extending from opposing sides of the second pixel electrode and the fourth pixel electrode, respectively.

Switching elements respectively connected to pixel electrodes in a $(2k-1)$-th row ($k$ being a natural number) and switching elements respectively connected to pixel electrodes in a $2k$-th row may be connected to one gate line in common.

A switching element connected to a pixel electrode in a $2k$-th row may be between two pixel electrodes in a $(2k+1)$-th row and adjacent to the pixel electrode in the $2k$-th row.

A switching element connected to a pixel electrode in a $2k$-th row may be between two pixel electrodes in a $(2k-1)$-th row and adjacent to the pixel electrode in the $2k$-th row.

A width of one pixel electrode in one of two adjacent rows may be greater than, less than, or equal to a distance between two pixel electrodes adjacent to the one pixel electrode and in the other row.

A portion of a pixel electrode in one row may be between a pixel electrode in another row adjacent to the one row and a pixel electrode in still another row adjacent to the one row.

The pixel electrode in the another row and the pixel electrode in the still another row may be in the same column.

An inner angle between a first imaginary line segment connecting respective center points of two adjacent pixel electrodes in one row and a second imaginary line segment connecting a center point of a pixel electrode in another row and adjacent to the two pixel electrodes and one of the center points of the two pixel electrodes may be in a range of about 50 degrees to about 55 degrees.

An interval between data lines at opposite sides of the pixel electrode may be greater than an interval between data lines at opposite sides of the switching element.

Each of the gate lines may have a zigzag shape.

Each of the data lines has a linear shape or a zigzag shape.

The pixel electrode may be in a pixel area of each of the pixels, the switching element may be in a non-pixel area of each of the pixels, and a ratio of the pixel area to the non-pixel area may be about 3:7.

Two adjacent pixels in one row and one pixel adjacent to the two pixels and in another row may display different colors from one another.

The three pixels may be connected to one gate line in common.

A switching element of at least one of the pixels may include a gate electrode connected to the gate line, a drain electrode connected to the data line, and a source electrode connected to the pixel electrode, and a pixel electrode of the at least one of the pixels may overlap the drain electrode.

The liquid crystal display device may further include a connecting electrode connecting the pixel electrode of the at least one of the pixels and the source electrode.

The connecting electrode may overlap the gate electrode, the drain electrode, and the source electrode.

An interval between the pixel electrode of the at least one of the pixels and the data line may be less than an interval between the connecting electrode and the data line.

The liquid crystal display device may further include a light blocking layer defined with apertures, the apertures defined corresponding to the pixel electrodes.

The pixel electrodes and the light blocking layer may be on the first substrate.

The liquid crystal display device may further include a color filter disposed corresponding to the aperture of the light blocking layer.

The switching element of the at least one of the pixels may include a semiconductor layer including indium gallium zinc oxide (IGZO) or amorphous indium gallium zinc oxide (a-IGZO).

In accordance with one or more embodiments, a liquid crystal display ("LCD") device includes a liquid crystal layer between a first substrate and a second substrate, a plurality of gate lines and a plurality of data lines, and a plurality of pixels connected to the plurality of gate lines and the plurality of data lines, the plurality of pixels including a pixel electrode and a switching element connected to the pixel electrode, the plurality of pixels being arranged in a matrix along a first direction and a second direciton crossing the first direction. Adjacent pixel electrodes in the second direction may be offset from one another in the first direction.

Adjacent pixel electrodes in the second direction may not overlap one another.

Adjacent pixel electrodes in the second direction may have inverted structures.

BRIEF DESCRIPTION OF THE DRAWINGS

Features will become apparent to those of ordinary skill in the art by describing in detail exemplary embodiments with reference to the attached drawings in which:

FIG. 15 illustrates a plan view of a light blocking layer of FIG. 11.

DETAILED DESCRIPTION

Figure 1:
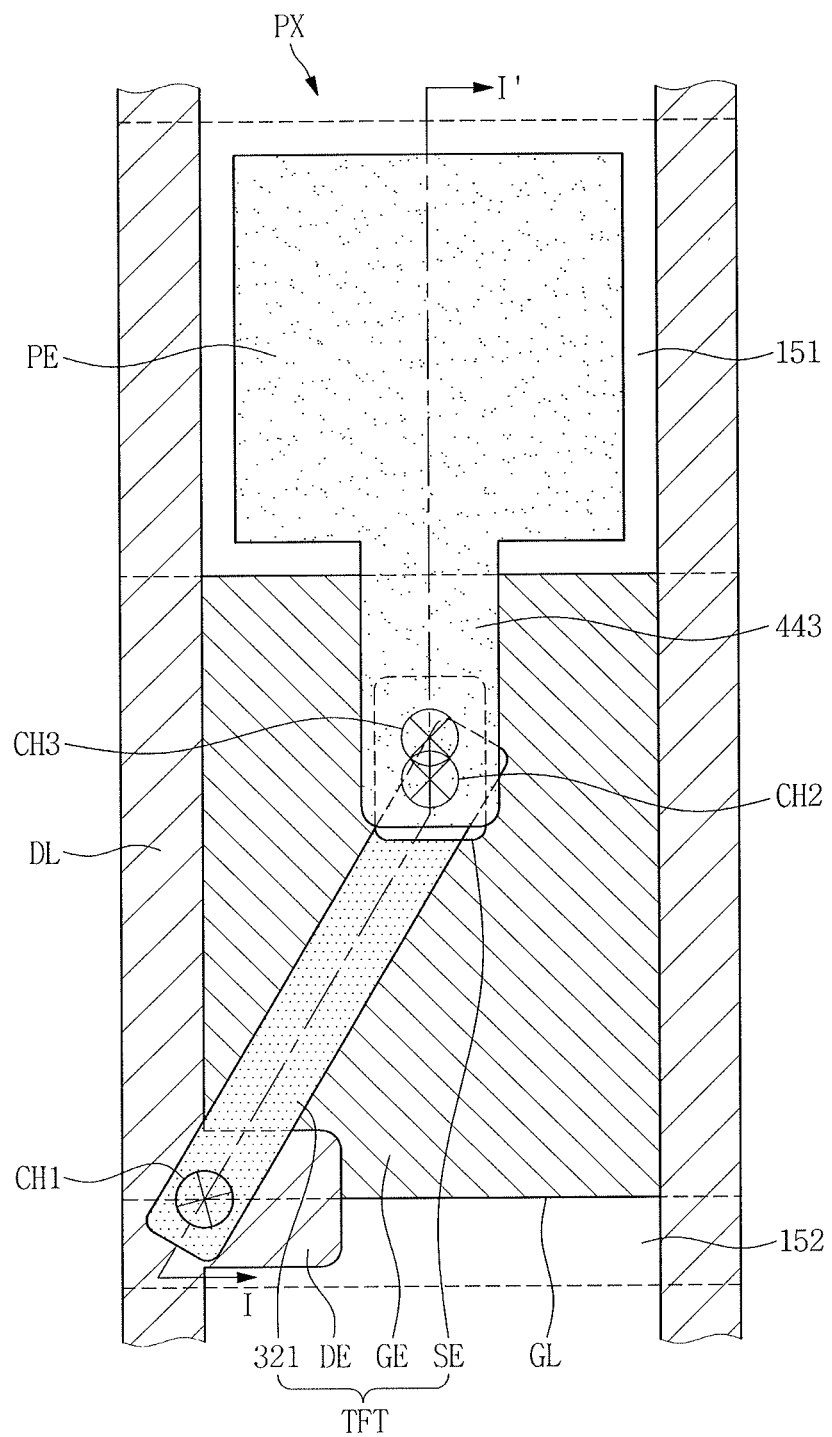
FIG. 1 illustrates a plan view of an embodiment of a pixel.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawing figures, the dimensions of layers and regions may be exaggerated for clarity of illustration. It will also be understood that when an element (e.g., a layer) is referred to as being "on" another element or substrate, it can be directly on the other element or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device disposed "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Figure 2:
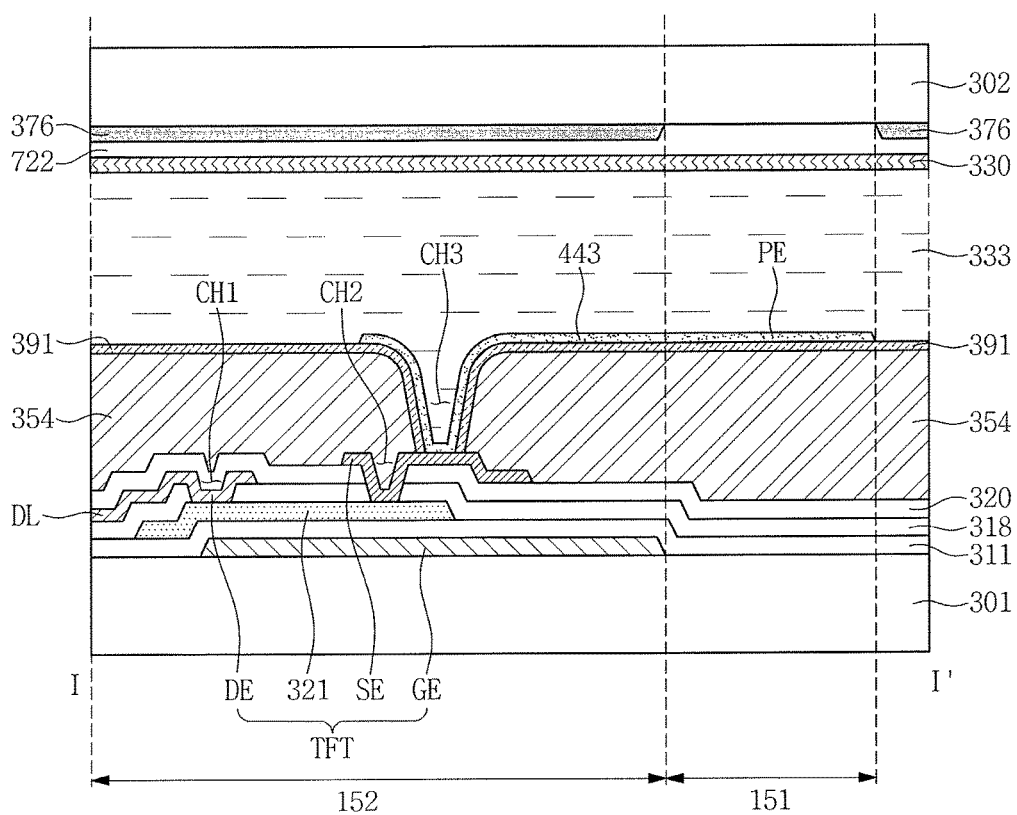
FIG. 2 illustrates a cross-sectional view taken along line I-I' of FIG. 1.

FIG. 1 illustrates a plan view of an embodiment of a pixel PX. FIG. 2 illustrates a cross-sectional view taken along line I-I' of FIG. 1.

Referring to FIGS. 1 and 2, the pixel PX includes a switching element TFT, a gate insulating layer 311, an insulating interlayer 318, a passivation layer 320, a color filter 354, a capping layer 391, a pixel electrode PE, a liquid crystal layer 333, a light blocking layer 376, an overcoat layer 722, and a common electrode 330.

The pixel electrode PE is disposed in a pixel area 151 of the pixel PX, and the switching element TFT is disposed in a non-pixel area 152 of the pixel PX. The pixel area 151 is smaller than the non-pixel area 152. For example, a ratio of the pixel area 151 to the non-pixel area 152 is about 3:7.

In an exemplary embodiment, the switching element TFT is connected to a gate line GL, a data line DL, and the pixel electrode PE. In such an exemplary embodiment, the switching element TFT includes a gate electrode GE connected to the gate line GL, a drain electrode DE connected to the data line DL, a source electrode SE connected to the pixel electrode PE, and a semiconductor layer 321 connected to the drain electrode DE and the source electrode SE.

The switching element TFT may include a thin film transistor.

The switching element TFT, the gate line GL, the data line DL, the gate insulating layer 311, the insulating interlayer 318, the passivation layer 320, the color filter 354, the capping layer 391, and the pixel electrode PE may be disposed on a first substrate 301.

The light blocking layer 376, the overcoat layer 722, and the common electrode 330 may be disposed on a second substrate 302.

The gate line GL includes the plurality of gate electrodes GE. Although not illustrated, the gate line GL may have a connecting portion, for example, an end portion thereof, which has a wider width than a width of another portion thereof, to be connected to another layer or an external driving circuit.

In an exemplary embodiment, the gate line GL may include at least one of an aluminum (Al)-based metal, e.g., Al or an Al alloy, a silver (Ag)-based metal, e.g., Ag or a Ag alloy, a copper (Cu)-based metal, e.g., Cu or a Cu alloy, and/or a molybdenum (Mo)-based metal, e.g., Mo or a Mo alloy. In another exemplary embodiment, the gate line GL may include one of chromium (Cr), tantalum (Ta), and titanium (Ti). In an exemplary embodiment, the gate line GL may have a multilayer structure including at least two conductive layers having different physical properties from one another.

In an exemplary embodiment, the gate electrode GE may include substantially the same material and may have substantially the same structure (e.g., multilayer structure) as those of the gate line GL. In such an exemplary embodiment, the gate electrode GE and the gate line GL may be simultaneously provided in the same process.

As illustrated in FIG. 2, in an exemplary embodiment, the gate insulating layer 311 is disposed on the gate line GL and the gate electrode GE. In such an exemplary embodiment, the gate insulating layer 311 may be disposed on substantially the entire surface of the first substrate 301 on which the gate line GL and the gate electrode GE are disposed. The gate insulating layer 311 may include silicon nitride ($SiN_X$), silicon oxide ($SiO_X$), or the like. The gate insulating layer 311 may have a multilayer structure including at least two insulating layers having different physical properties from one another.

As illustrated in FIG. 2, in an exemplary embodiment, the semiconductor layer 321 is disposed on the gate insulating layer 311. As illustrated in FIGS. 1 and 2, in an exemplary embodiment, the semiconductor layer 321 overlaps at least a portion of the gate electrode GE. The semiconductor layer 321 may include amorphous silicon, polycrystalline silicon, or the like.

As illustrated in FIG. 2, in an exemplary embodiment, the insulating interlayer 318 is disposed on the semiconductor layer 321 and the gate insulating layer 311. In such an exemplary embodiment, the insulating interlayer 318 may be disposed on substantially the entire surface of the first substrate 301 on which the semiconductor layer 321 is disposed. First and second contact holes CH1 and CH2 are defined in the insulating interlayer 318. The insulating interlayer 318 may include $SiN_X$, $SiO_X$, or the like. The insulating interlayer 318 may have a multilayer structure including at least two insulating layers having different physical properties from one another.

As illustrated in FIG. 2, in an exemplary embodiment, the data line DL and the drain electrode DE are disposed on the insulating interlayer 318. In such an exemplary embodiment, the drain electrode DE is connected to the semiconductor layer 321 through the first contact hole CH1 defined in the insulating interlayer 318.

An ohmic contact layer may further be disposed at an interface between the drain electrode DE and the semiconductor layer 321. The ohmic contact layer may include silicide, or n+ hydrogenated amorphous silicon doped with n-type impurities, e.g., phosphorus (P) or phosphine ($PH_3$), at high concentration.

The data line DL may have a connecting portion, e.g., an end portion thereof, to be connected to another layer or an external driving circuit. The connecting portion may be wider than other portions thereof.

The data line DL intersects the gate line GL. The data line DL may be narrower at a portion thereof that intersects the gate line GL than at other portions thereof. Accordingly, parasitic capacitance between the data line DL and the gate line GL may be reduced.

In an exemplary embodiment, the data line DL may include a refractory metal, e.g., molybdenum (Mo), chromium (Cr), tantalum (Ta), and titanium (Ti), or an alloy thereof. In an exemplary embodiment, the data line DL may have a multilayer structure including a refractory metal layer and a low-resistance conductive layer. Examples of the multilayer structure may include a double-layer structure including a Cr or Mo (alloy) lower layer and an Al (alloy) upper layer, and a triple-layer structure including a Mo (alloy) lower layer, an Al (alloy) intermediate layer, and a Mo (alloy) upper layer. Further, the data line DL may include any suitable metal or conductor, in addition to, or instead of, the aforementioned materials.

As illustrated in FIG. 1, in an exemplary embodiment, the drain electrode DE protrudes from the data line DL. In such an exemplary embodiment, the drain electrode DE may be a portion of the data line DL. In an exemplary embodiment, the drain electrode DE may include substantially the same material and may have substantially the same structure (e.g., multilayer structure) as those of the data line DL. In such an exemplary embodiment, the drain electrode DE and the data line DL may be simultaneously provided in the same process.

As illustrated in FIG. 2, in an exemplary embodiment, the passivation layer 320 is disposed on the data line DL and the insulating interlayer 318. In such an exemplary embodiment, the passivation layer 320 may be disposed on substantially the entire surface of the first substrate 301 on which the data line DL and the insulating interlayer 318 are disposed. The second contact hole CH2 may be defined through the passivation layer 320.

In an exemplary embodiment, the passivation layer 320 may include an inorganic insulating material, e.g., $SiN_X$ or $SiO_X$. In such an exemplary embodiment, the inorganic insulating material may have photosensitivity and a dielectric constant of about 4.0. In another exemplary embodiment, the passivation layer 320 may have a double-layer structure including a lower inorganic layer and an upper organic layer. The double-layer structure of the passivation layer 320 may substantially reduce or effectively prevent damage to an exposed portion of the semiconductor layer 321, and may allow for a relatively high insulating property. In an exemplary embodiment, the passivation layer 320 may have a thickness of greater than or equal to about 5,000 ångstroms (Å), for example, in a range of about 6,000 Å to about 8,000 Å.

As illustrated in FIG. 2, in an exemplary embodiment, the source electrode SE is disposed on the passivation layer 320. In such an exemplary embodiment, the source electrode SE is connected to the semiconductor layer 321 through the second contact hole CH2 defined in the insulating interlayer 318 and in the passivation layer 320. An ohmic contact layer may further be disposed at an interface between the source electrode SE and the semiconductor layer 321.

The source electrode SE may include substantially the same material and may have substantially the same structure (e.g., multilayer structure) as those of the data line DL.

As illustrated in FIG. 2, in an exemplary embodiment, the color filter 354 is disposed on the source electrode SE and the passivation layer 320. An edge of the color filter 354 is disposed on the gate line GL and the data line DL. However, the color filter 354 may be absent at a position corresponding to a third contact hole CH3. In another exemplary embodiment, an edge of one of the color filters 354 may overlap an edge of an adjacent one of the color filters 354. The color filter 354 may include a photosensitive organic material.

As illustrated in FIG. 2, in an exemplary embodiment, the capping layer 391 is disposed on the color filter 354. The capping layer 391 may prevent impurities generated from the color filter 354 from being diffused to the liquid crystal layer 333. The third contact hole CH3 is defined in the capping layer 391. The capping layer 391 may include SiNx, SiOx, or the like.

As illustrated in FIGS. 1 and 2, in an exemplary embodiment, the pixel electrode PE is disposed on a portion of the capping layer 391 that is in the pixel area 151.

In an exemplary embodiment, the pixel electrode PE may include a transparent conductive material, e.g., indium—tin oxide ("ITO") or indium—zinc oxide ("IZO"). In such an exemplary embodiment, for example, ITO may include a polycrystalline or monocrystalline material, and IZO may include a polycrystalline or monocrystalline material. Alternatively, IZO may include an amorphous material.

A connecting electrode 443 is disposed on the capping layer 391. The connecting electrode 443 may extend from the pixel electrode PE to the non-pixel area 152. The connecting electrode 443 may be unitary with the pixel electrode PE. The connecting electrode 443 has a smaller planar area than a planar area of the pixel electrode PE. The connecting electrode 443 is disposed in the pixel area 151 and the non-pixel area 152. The connecting electrode 443 is connected to the source electrode SE through the third contact hole CH3 defined in the capping layer 391.

In an exemplary embodiment, the connecting electrode 443 and the pixel electrode PE may include substantially the same material. In such an exemplary embodiment, the connecting electrode 443 and the pixel electrode PE may be simultaneously provided in the same process. In another exemplary embodiment, the connecting electrode 443 and the source electrode SE may include substantially the same material. For example, the connecting electrode 443 may be unitary with the source electrode SE. In such an exemplary embodiment, the connecting electrode 443 and the source electrode SE may be simultaneously provided in the same process. In such an exemplary embodiment, the connecting electrode 443 is connected to the pixel electrode PE through the third contact hole CH3.

As illustrated in FIG. 2, in an exemplary embodiment, the light blocking layer 376 is disposed on the second substrate 302. The light blocking layer 376 is disposed on an area other than the pixel area 151. In another exemplary embodiment, the light blocking layer 376 may be disposed on the first substrate 301.

In an exemplary embodiment, the overcoat layer 722 is disposed on the light blocking layer 376. In such an exemplary embodiment, the overcoat layer 722 may be disposed on substantially the entire surface of the second substrate 302 on which the light blocking layer 376 is disposed. The overcoat layer 722 may effectively remove a step difference among components between the overcoat layer 722 and the second substrate 302, i.e., the components of the second substrate 302, e.g., the light blocking layer 376. In another exemplary embodiment, the overcoat layer 722 may be omitted.

In an exemplary embodiment, the common electrode 330 is disposed on the overcoat layer 722. In such an exemplary embodiment, the common electrode 330 may be disposed on substantially the entire surface of the second substrate 302 on which the overcoat layer 722 is disposed. In another exemplary embodiment, the common electrode 330 may be disposed on a portion of the overcoat layer 722 that corresponds to the pixel area 151. A common voltage is applied to the common electrode 330.

Although not illustrated, the pixel PX may further include a first polarizer and a second polarizer. When surfaces of the first substrate 301 and the second substrate 302 opposing one another are defined as upper surfaces, e.g., inner surfaces, of the corresponding substrates, respectively, and surfaces of the first substrate 301 and the second substrate 302 disposed opposite to the upper surfaces thereof are defined as lower surfaces, e.g., outer surfaces, of the corresponding substrates, respectively, the first polarizer may further be disposed on the lower surface of the first substrate 301 and the second polarizer may further be disposed on the lower surface of the second substrate 302.

A transmission axis of the first polarizer may be substantially perpendicular to a transmission axis of the second polarizer, such that one of the two transmission axes may be aligned in parallel to the gate line GL. In another exemplary embodiment, the LCD device may include only one of the first polarizer and the second polarizer.

The first substrate 301 and the second substrate 302 may be an insulating substrate including glass, plastic, or the like.

In an exemplary embodiment, the liquid crystal layer 333 disposed between the first substrate 301 and the second substrate 302 may include liquid crystal molecules. In such an exemplary embodiment, the liquid crystal molecules of the liquid crystal layer 333 may be twisted nematic liquid crystal molecules.

Figure 3:
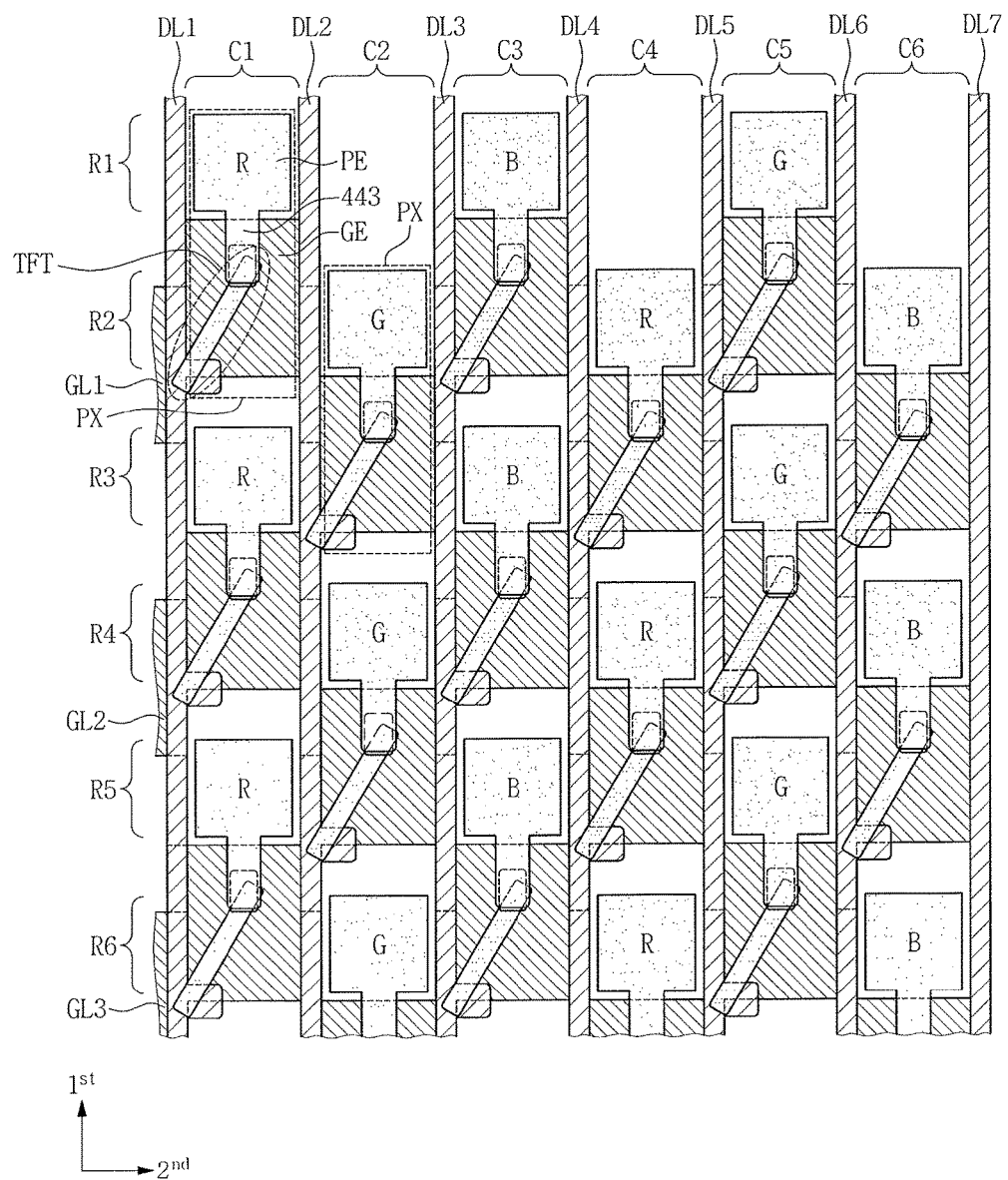
FIG. 3 illustrates an embodiment of a plurality of pixels included in a liquid crystal display ("LCD") device, each of which has the structure of FIG. 1.

FIG. 3 illustrates an embodiment of a plurality of pixels PX included in an LCD device, each of which has the structure of FIG. 1. Referring to FIG. 3, in an exemplary embodiment, each of the plurality of pixels PX has substantially the same structure as that of the pixel PX illustrated in FIG. 1. In such an exemplary embodiment, each of the pixels PX illustrated in FIG. 3 has substantially the same planar and cross-sectional structure as that of the pixel PX illustrated in FIG. 1. The pixels are arranged in a matrix for, e.g., arranged along a first direction and a second direction intersecting the first direction.

Pixels PX in a predetermined column are shifted downwards or upwards, e.g., along the first direction, relative to pixels PX in another column adjacent thereto in the second direction. As illustrated in FIG. 3, in an exemplary embodiment, pixels PX in one of even-numbered columns C2, C4, and C6 are shifted downwards along the data line DL (e.g., a second data line DL2), e.g., the first direction, relative to pixels PX in one of odd-numbered columns C1, C3, and C5. In such an exemplary embodiment, for example, when a data driver (not illustrated) for driving data lines DL1, DL2, DL3, DL4, DL5, DL6, and DL7 illustrated in FIG. 3 is disposed upwardly of the data lines DL1, DL2, DL3, DL4, DL5, DL6, and DL7, the pixels PX in the even-numbered column are sequentially disposed further away (e.g., from a farther row) from the data driver than are the pixels PX in the odd-numbered column.

Accordingly, a switching element TFT connected to a pixel electrode PE in a 2k-th row ("k" being a natural number) is disposed between two pixel electrodes PE in a (2k+1)-th row and adjacent to the pixel electrode PE in the 2k-th row. As illustrated in FIG. 3, in an exemplary embodiment, when a pixel electrode PE in a second row R2 and a second column C2 is defined as a first pixel electrode, a pixel electrode PE in a third row R3 and a first column C1 is defined as a second pixel electrode, and a pixel electrode PE in the third row R3 and a third column C3 is defined as a third pixel electrode, a switching element TFT connected to the first pixel electrode is disposed between the second pixel electrode and the third pixel electrode.

Switching elements TFT respectively connected to pixel electrodes PE in a (2k−1)-th row and switching elements TFT respectively connected to pixel electrodes PE in the 2k-th row are connected to one gate line GL in common. As illustrated in FIG. 3, in an exemplary embodiment, switching elements TFT respectively connected to pixel electrodes PE in the first row R1 and switching elements TFT respectively connected to pixel electrodes PE in the second row R2 are connected to a first gate line GL1 in common. In an exemplary embodiment, the first gate line GL1 includes a plurality of gate electrodes GE which are connected to one another. In such an exemplary embodiment, odd-numbered gate electrodes GE are connected to the switching elements TFT for driving the pixel electrodes PE in the first row R1, respectively, and even-numbered gate electrodes GE are connected to the switching elements TFT for driving the pixel electrodes PE in the second row R2, respectively. Accordingly, the first gate line GL1 including the plurality of gate electrodes GE disposed in the above-described manner has a zigzag shape. Each of the other gate lines GL has substantially the same shape as that of the first gate line GL1. However, the gate lines GL may not be connected to one another. For example, the first gate line GL1 and a second gate line GL2 may not be connected to one another.

In an exemplary embodiment, pixel electrodes PE in one of odd-numbered rows R1, R3, and R5 are disposed in the odd-numbered columns C1, C3, and C5, respectively. In such an exemplary embodiment, the pixel electrodes PE in the odd-numbered row are disposed between a (2x−1)-th data line ("x" being a natural number) and a 2x-th data line. As illustrated in FIG. 3, in an exemplary embodiment, the pixel electrodes PE in the first row R1 are disposed in the first column C1, the third column C3, and the fifth column C5, respectively. In such an exemplary embodiment, the pixel electrodes PE in the first row R1 are disposed between the first data line DL1 and the second data line DL2, between the third data line DL3 and the fourth data line DL4, and between the fifth data line DL5 and the sixth data line DL6, respectively.

In an exemplary embodiment, pixel electrodes PE in one of even-numbered rows R2, R4, and R6 are disposed in the even-numbered columns C2, C4, and C6, respectively. In such an exemplary embodiment, the pixel electrodes PE in the even-numbered row are disposed between the 2x-th data line and a (2x+1)-th data line. As illustrated in FIG. 3, in an exemplary embodiment, the pixel electrodes PE in the second row R2 are disposed in the second column C2, the fourth column C4, and the sixth column C6, respectively. In such an exemplary embodiment, the pixel electrodes PE in the second row R2 are disposed between the second data line DL2 and the third data line DL3, between the fourth data line DL4 and the fifth data line DL5, and between the sixth data line DL6 and the seventh data line DL7, respectively. However, an outermost one of the pixel electrodes PE in the even-numbered row is disposed between the data line DL and an edge of the first substrate 301.

Alternatively, the pixel electrodes PE in one of the odd-numbered rows R1, R3, and R5 may be disposed in the even-numbered columns C2, C4, and C6, respectively, and the pixel electrodes PE in one of the even-numbered rows R2, R4, and R6 may be disposed in the odd-numbered columns C1, C3, and C5, respectively. In such an exemplary embodiment, the pixel electrodes PE in the odd-numbered row may be disposed between the 2x-th data line and the (2x+1)-th data line, and the pixel electrodes PE in the even-numbered row may be disposed between the (2x−1)-th data line and the 2x-th data line.

Each of the pixels PX is connected to one of respective data lines DL at opposite sides of the pixel PX. As illustrated in FIG. 3, in an exemplary embodiment, for example, each of the pixels PX may be connected to a left one of the respective data lines DL at the opposite sides of the pixel PX. The pixel PX is connected to the data line DL through the switching element TFT.

A pixel electrode PE in one of two adjacent rows is not disposed between adjacent pixel electrodes PE in the other row. As illustrated in FIG. 3, in an exemplary embodiment, when the pixel electrode PE in the second row R2 and the second column C2 is defined as a first pixel electrode, a pixel electrode PE in the first row R1 and the first column C1 is defined as a second pixel electrode, and a pixel electrode PE in the first row R1 and the third column C3 is defined as a third pixel electrode, no portion of the first pixel electrode is disposed between the second pixel electrode and the third pixel electrode.

As such, adjacent ones of the pixel electrodes PE are diagonally adjacent to one another, and a pixel electrode in one of two adjacent rows is not disposed between two adjacent pixel electrodes in the other row. Thus, a distance between adjacent ones of the pixel electrodes in different rows may increase. Accordingly, an electric field and a liquid crystal molecular movement in one pixel may not interfere with an electric field and a liquid crystal molecular movement in an adjacent pixel.

In FIG. 3, a pixel PX that includes the pixel electrode PE denoted by "R" is a red pixel R displaying a red color; a pixel PX including the pixel electrode PE denoted by "G" is a green pixel G displaying a green color; and a pixel PX including the pixel electrode PE denoted by "B" is a blue pixel B displaying blue color. Three adjacent pixels PX connected to one gate line GL in common may collectively define a main pixel. As illustrated in FIG. 3, in an exemplary embodiment, a red pixel R, a green pixel G, and a blue pixel B connected to the first gate line GL1 in common and adjacent to one another may collectively define a main pixel.

Figure 4:
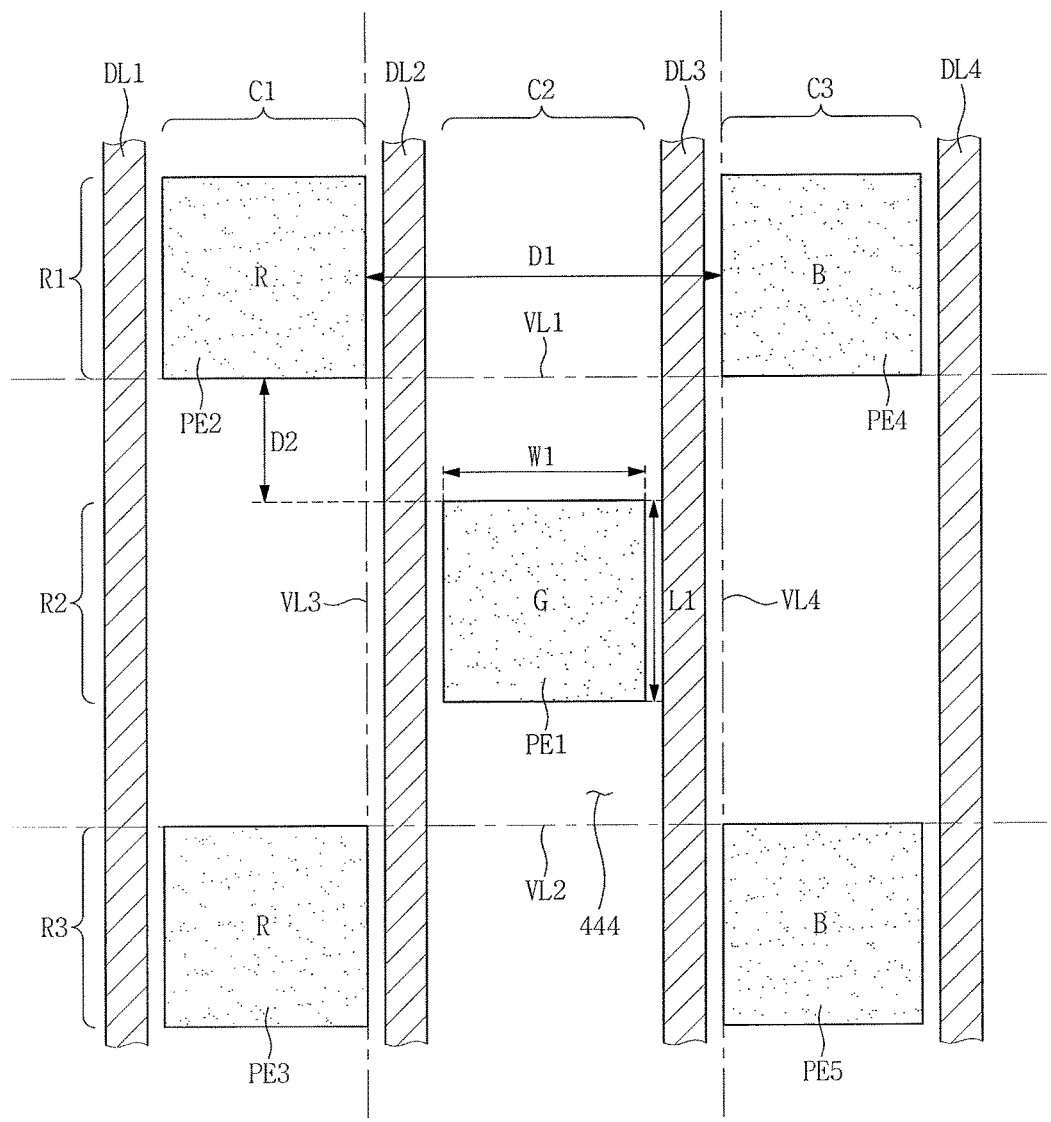
FIG. 4 illustrates an embodiment of a plurality of pixel electrodes in a predetermined area of FIG. 3.

In an exemplary embodiment, the first pixel electrode may be disposed in an area defined in a manner that will be described hereinbelow with reference to FIG. 4. FIG. 4 illustrates an embodiment of a plurality of pixel electrodes PE in a predetermined area of FIG. 3.

Referring to FIG. 4, in an exemplary embodiment, a pixel electrode PE in a second row R2 and a second column C2 is defined as a first pixel electrode PE1, and four pixel electrodes PE adjacent to the first pixel electrode PE1 and in two different rows are defined as second, third, fourth, and fifth pixel electrodes PE2, PE3, PE4, and PE5. In such an exemplary embodiment, a pixel electrode PE in a first row R1 and a first column C1 is defined as the second pixel electrode PE2, a pixel electrode PE in a third row R3 and the first column C1 is defined as the third pixel electrode PE3, a pixel electrode PE in the first row R1 and a third column C3 is defined as the fourth pixel electrode PE4, and a pixel electrode PE in the third row R3 and the third column C3 is defined as the fifth pixel electrode PE5.

In such an exemplary embodiment, an imaginary line extending from one (e.g., a side of the second pixel electrode PE2) of opposing sides of the second pixel electrode PE2 and the third pixel electrode PE3 is defined as a first line VL1, and an imaginary line extending from the other (e.g., a side of the third pixel electrode PE3) of the opposing sides of the second pixel electrode PE2 and the third pixel electrode PE3 is defined as a second line VL2. In addition, an imaginary line extending from one (e.g., a side of the second pixel electrode PE2) of opposing sides of the second pixel electrode PE2 and the fourth pixel electrode PE4 is defined as a third line VL3, and an imaginary line extending from the other (e.g., a side of the fourth pixel electrode PE4) of the opposing sides of the second pixel electrode PE2 and the fourth pixel electrode PE4 is defined as a fourth line VL4.

In an exemplary embodiment, the first pixel electrode PE1 is disposed between the first line VL1 and the second line VL2. In such an exemplary embodiment, the first pixel electrode PE1 is not disposed between the second pixel electrode PE2 and the fourth pixel electrode PE4. In such an exemplary embodiment, the first pixel electrode PE1 is not disposed between the third pixel electrode PE3 and the fifth pixel electrode PE5.

In an exemplary embodiment, the first pixel electrode PE1 may be disposed between the first line VL1 and the second line VL2, and between the third line VL3 and the fourth line VL4. In such an exemplary embodiment, the first pixel electrode PE1 may be disposed in an area 444 defined by the first, second, third, and fourth lines VL1, VL2, VL3, and VL4. In such an exemplary embodiment, the first pixel electrode PE1 is not disposed between the second pixel electrode PE2 and the fourth pixel electrode PE4. In addition, the first pixel electrode PE1 is not disposed between the third pixel electrode PE3 and the fifth pixel electrode PE5.

A width along the second direction of one pixel electrode PE in one of two adjacent rows may be less than a distance along the second direction between two pixel electrodes PE adjacent to the one pixel electrode PE and in the other row. As illustrated in FIG. 4, in an exemplary embodiment, a width W1 of the first pixel electrode PE1 may be less than a distance D1 between the second pixel electrode PE2 and the third pixel electrode PE3.

Figure 5:
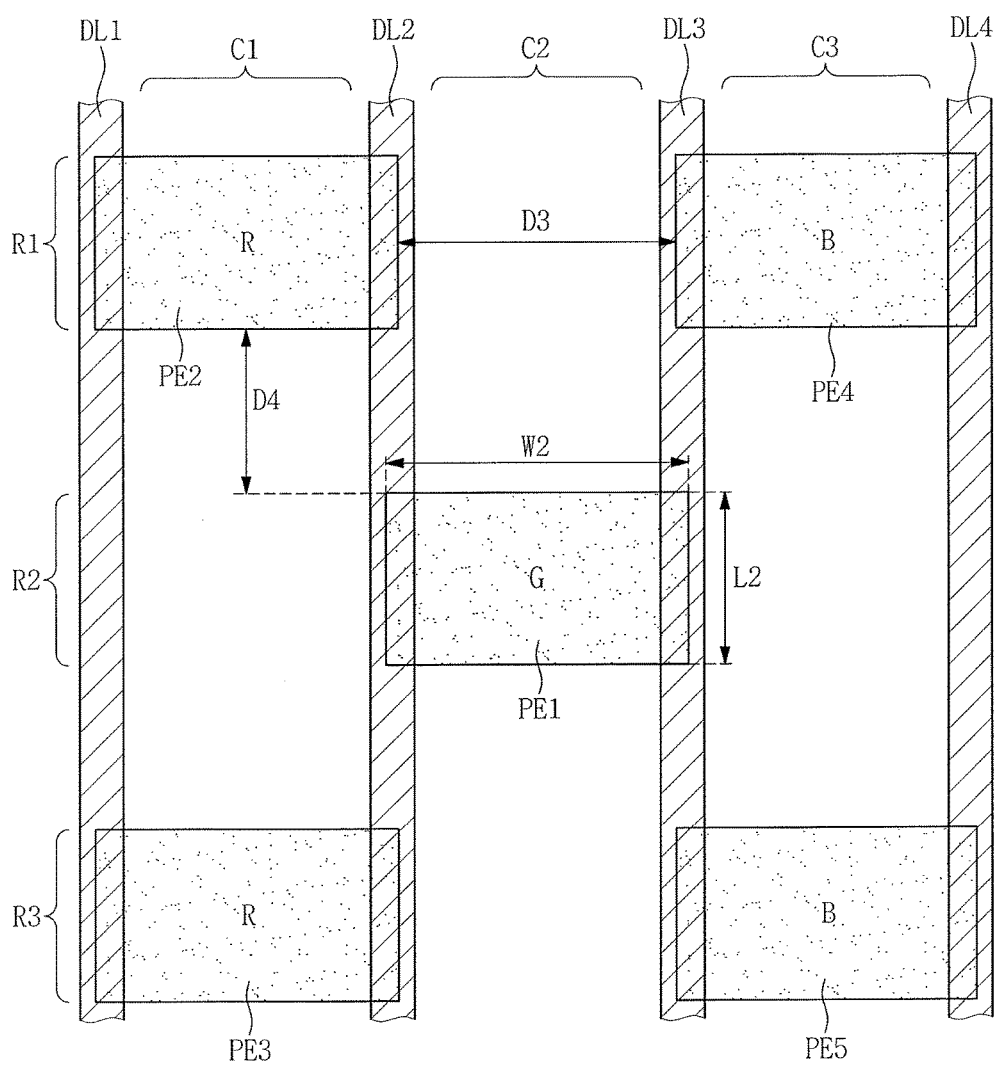
FIG. 5 illustrates another embodiment of a plurality of pixel electrodes in a predetermined area of FIG. 3.

In another exemplary embodiment, each of the pixel electrodes PE may overlap the data line DL. The descriptions pertaining thereto will be provided in detail hereinbelow with reference to FIG. 5. FIG. 5 illustrates another embodiment of a plurality of pixel electrodes PE in a predetermined area of FIG. 3.

Each of the pixel electrodes PE may overlap at least one of two adjacent data lines DL on opposite sides of the pixel electrode PE. As illustrated in FIG. 5, in an exemplary embodiment, one side of a first pixel electrode PE1 may extend further toward a second data line DL2 to be disposed on the second data line DL2. Another side of the first pixel electrode PE1 may extend further toward a third data line DL3 to be disposed on the third data line DL3. In such an exemplary embodiment, the other pixel electrodes PE illustrated in FIG. 5, e.g., second, third, fourth, and fifth pixel electrodes PE2, PE3, PE4, and PE5, may overlap the data line DL, in a manner similar to that of the first pixel electrode PE1.

In such an exemplary embodiment, a portion of a pixel electrode PE in one row may be disposed between a pixel electrode PE in another row adjacent to the one row and a pixel electrode PE in still another row adjacent to the one row. In such an exemplary embodiment, the pixel electrode PE in the another row and the pixel electrode PE in the still another row are disposed in the same column. As illustrated in FIG. 5, in an exemplary embodiment, a portion of the first pixel electrode PE1 may be disposed between the second pixel electrode PE2 and the third pixel electrode PE3. In such an exemplary embodiment, an imaginary line extending along the one side of the first pixel electrode PE1 on the second data line DL2 may intersect the second pixel electrode PE2 and the third pixel electrode PE3. In other words, VL3 of FIG. 4 may intersect the first pixel electrode PE1.

A width along the second direction of one pixel electrode PE in one of two adjacent rows may be greater than or equal to a distance along the second direction between two pixel electrodes PE adjacent to the one pixel electrode PE and in the other row. As illustrated in FIG. 5, in an exemplary embodiment, a width W2 of the first pixel electrode PE1 may be greater than or equal to a distance D3 between the second pixel electrode PE2 and the fourth pixel electrode PE4.

The width of the pixel electrode PE of FIG. 5, e.g., the width W2 of the first pixel electrode PE1, may be greater than the width of the pixel electrode PE of FIG. 4, e.g., the width W1 of the first pixel electrode PE1 (W2>W1). The length along the first direction of the pixel electrode PE of FIG. 5, e.g., a length L2 of the first pixel electrode PE1, may be less than the length along the first direction of the pixel electrode PE of FIG. 4, e.g., a length L1 of the first pixel electrode PE1 (L2<L1). In such an exemplary embodiment, a distance D4 along the first direction between one side of the first pixel electrode PE1 and one side of the second pixel electrode PE2 illustrated in FIG. 5 may be greater than a distance D2 along the first direction between one side of the first pixel electrode PE1 and one side of the second pixel electrode PE2 illustrated in FIG. 4.

Figure 6:
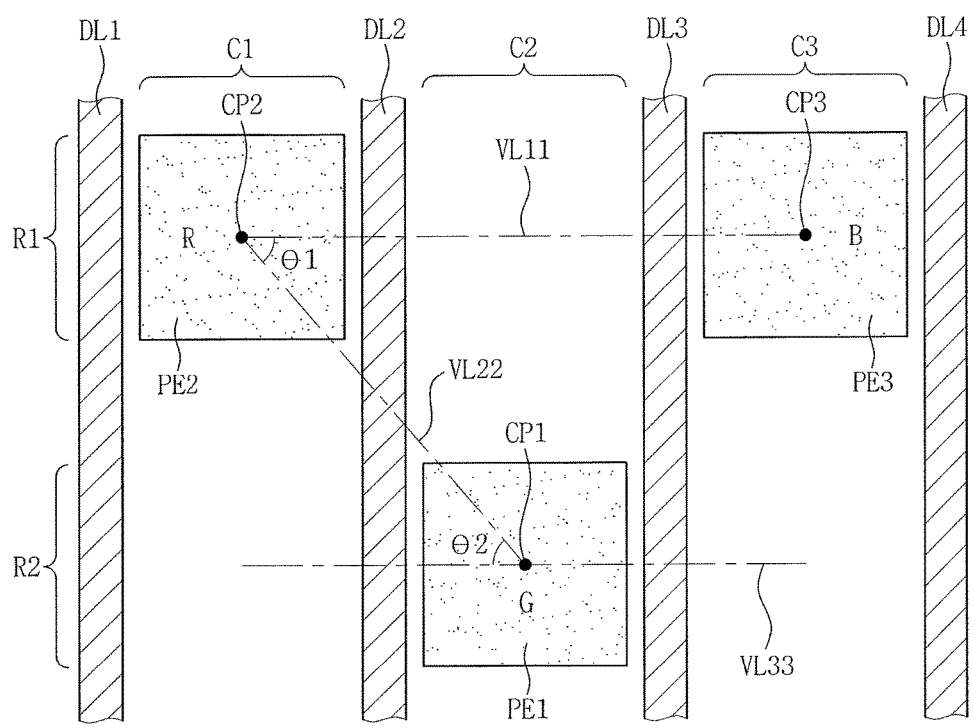
FIG. 6 illustrates an example of an angle between three adjacent pixel electrodes.

FIG. 6 illustrates an example of an angle between three adjacent pixel electrodes PE.

When a first line segment VL11 is an imaginary line segment connecting respective center points of two adjacent pixel electrodes PE in one row spaced apart by one column is defined as a first line segment, and a second line segment VL22 is an imaginary line segment connecting a center point of a pixel electrode PE in another row and in column adjacent to the two pixel electrodes PE and one of the center points of the two pixel electrodes PE, an inner angle between the first line segment VL11 and the second line segment VL22 is in a range of about 50 degrees to about 55 degrees. Referring to FIG. 6, in an exemplary embodiment, an inner angle θ1 between the first line segment VL11 connecting a center point CP2 of a second pixel electrode PE2 and a center point CP3 of a third pixel electrode PE3 and the second line segment VL22 connecting the center point CP2 of the second pixel electrode PE2 and a center point CP1 of a first pixel electrode PE1 may be in a range of about 50 degrees to about 55 degrees, e.g., about 52 degrees.

In an exemplary embodiment, an inner angle θ2 between the second line segment VL22 and an imaginary line VL33 that passes through the center point CP1 of the first pixel electrode PE1 and extends along the second direction to perpendicularly intersects the data line DL (e.g., a third data line DL3) may be in a range of about 50 degrees to about 55 degrees, e.g., about 52 degrees. When the first line segment VL11 is substantially parallel to the line VL33, θ1 and θ2 may be substantially equal.

Figure 7:
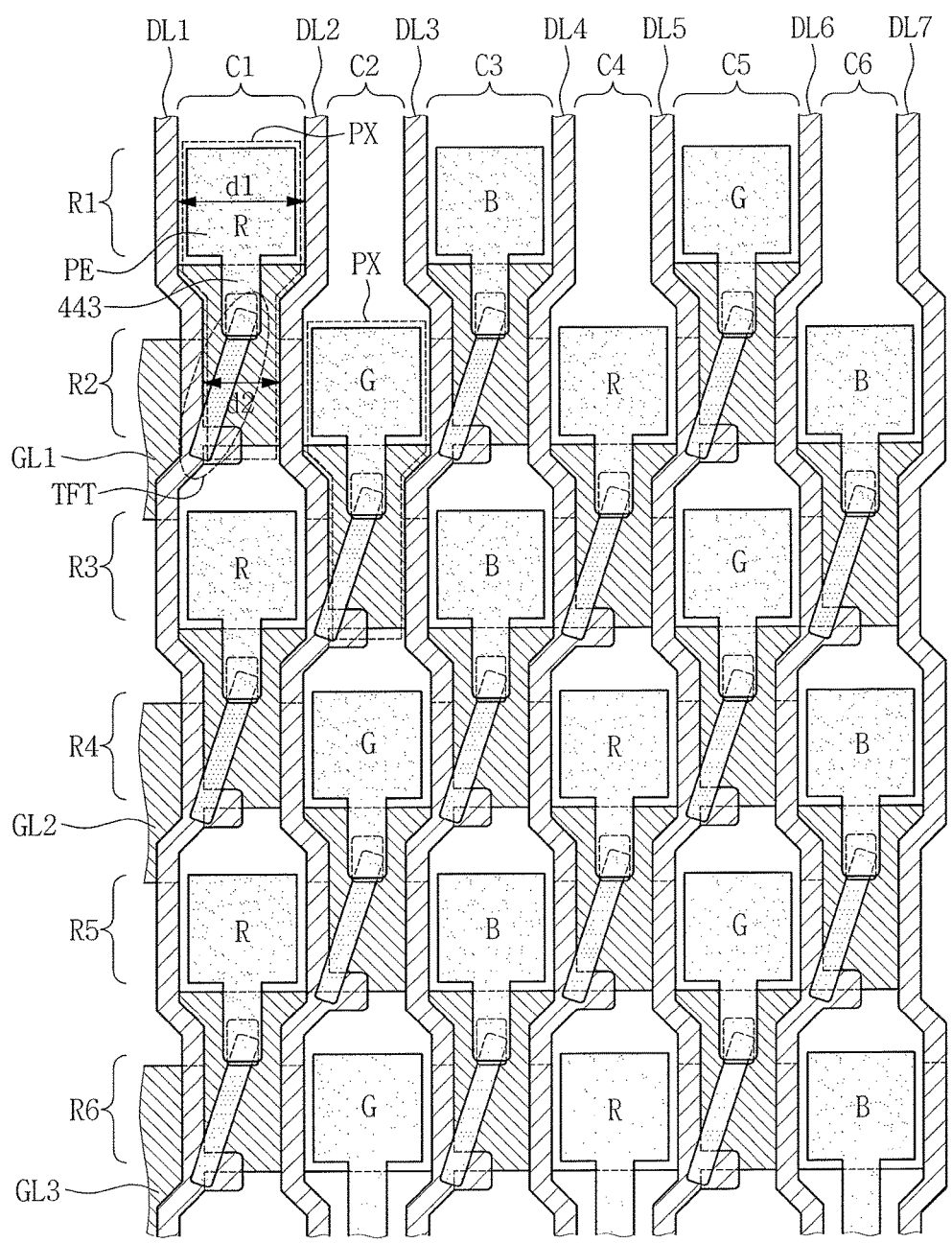
FIG. 7 illustrates another embodiment of a plurality of pixels included in an LCD device, each of which has the structure of FIG. 1.

FIG. 7 illustrates another embodiment of a plurality of pixels PX included in an LCD device, each of which has the structure of FIG. 1.

Referring to FIG. 7, in an exemplary embodiment, each of the plurality of pixels PX has substantially the same structure as that of the pixel PX illustrated in FIG. 1. In such an exemplary embodiment, each of the pixels PX illustrated in FIG. 7 has substantially the same planar and cross-sectional structure as that of the pixel PX illustrated in FIG. 1.

As illustrated in FIG. 7, in an exemplary embodiment, an interval d1 along the second direction between data lines DL1 and DL2 at opposite sides of a pixel electrode PE is greater than an interval d2 along the second direction between data lines DL1 and DL2 at opposite sides of a switching element TFT. Accordingly, each of data lines DL1, DL2, DL3, DL4, DL5, DL6, and DL7 has a zigzag shape.

The LCD device illustrated in FIG. 7 is substantially the same as that of FIG. 3, other than the shape of the data line, and thus, descriptions of the components illustrated in FIG. 7 will make reference to FIGS. 1, 2, 3, 4, 5, and 6 and related descriptions.

Figure 8:
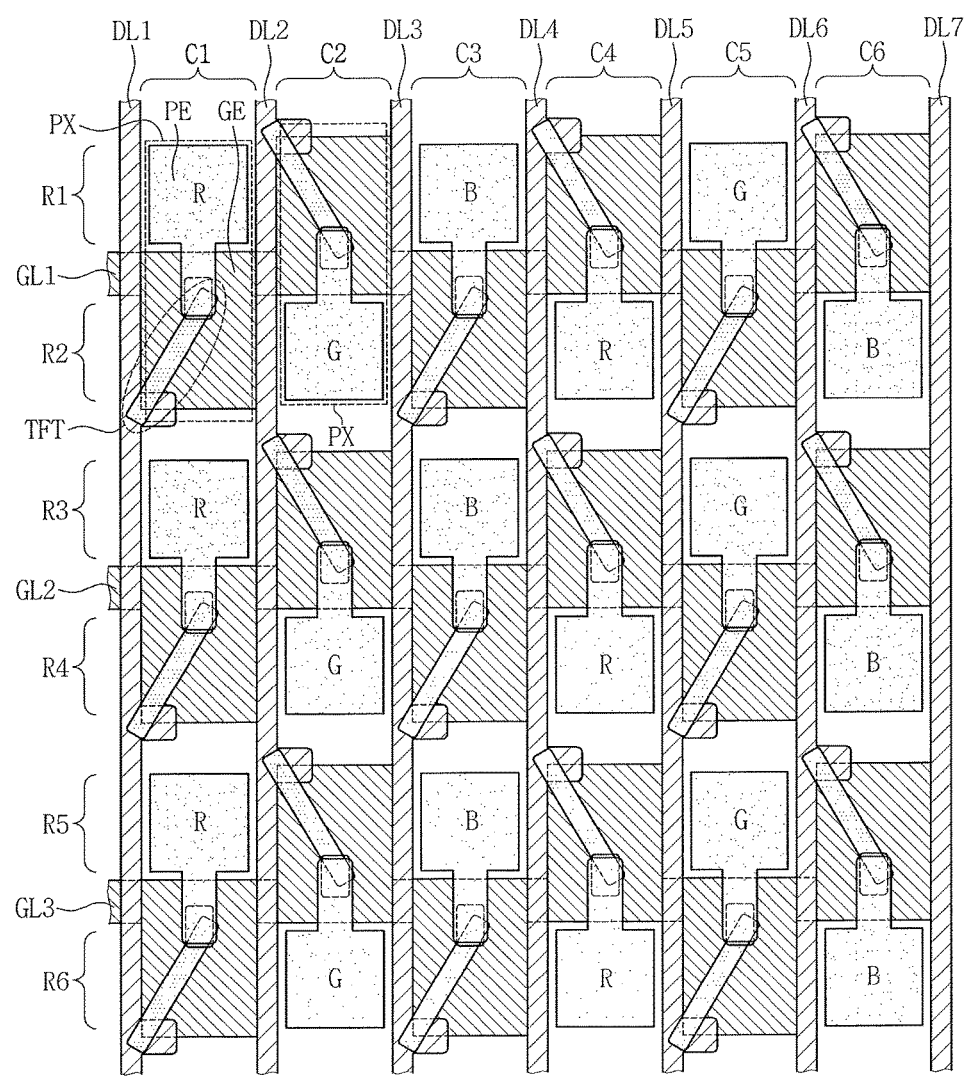
FIG. 8 illustrates still another embodiment of a plurality of pixels included in an LCD device, each of which has the structure of FIG. 1.

FIG. 8 illustrates still another embodiment of a plurality of pixels PX included in an LCD device, each of which has the structure of FIG. 1.

Referring to FIG. 8, in an exemplary embodiment, each of the plurality of pixels PX has substantially the same structure as that of the pixel PX illustrated in FIG. 1. In such an exemplary embodiment, each of the pixels PX illustrated in FIG. 8 has substantially the same planar and cross-sectional structure as that of the pixel PX illustrated in FIG. 1.

The shapes of a plurality of pixels PX in one column may be inverse to the shapes of a plurality of pixels PX in another column, respectively, e.g., may have a structure rotated by 180 degrees. As illustrated in FIG. 8, in an exemplary embodiment, the shapes of pixels PX in one of even-numbered columns C2, C4, and C6 may be inverse to the shapes of pixels PX in one of odd-numbered columns C1, C3, and C5, respectively. In such an exemplary embodiment, the shapes of the pixels PX in the odd-numbered column may be the same as the shapes of the pixels PX illustrated in FIG. 1, respectively, and the shapes of the pixels PX in the even-numbered column may be rotated 180 degrees with respect to the shapes of the pixels PX in FIG. 1, respectively. Accordingly, a switching element TFT connected to a pixel electrode PE in a 2k-th row is disposed between two pixel electrodes PE in a (2k−1)-th row and adjacent to the pixel electrode PE in the 2k-th row. As illustrated in FIG. 8, in an exemplary embodiment, when a pixel electrode PE in a second row R2 and the second column C2 is defined as a first pixel electrode, a pixel electrode PE in a first row R1 and the first column C1 is defined as a second pixel electrode, and a pixel electrode PE in the first row R1 and the third column C3 is defined as a third pixel electrode, a switching element TFT connected to the first pixel electrode is disposed between the second pixel electrode and the third pixel electrode.

The LCD device illustrated in FIG. 8 is substantially the same as that of FIG. 3, other than the position of the switching element, and thus, descriptions of the components illustrated in FIG. 8 will make reference to FIGS. 1, 2, 3, 4, 5, and 6 and related descriptions.

Figure 9:
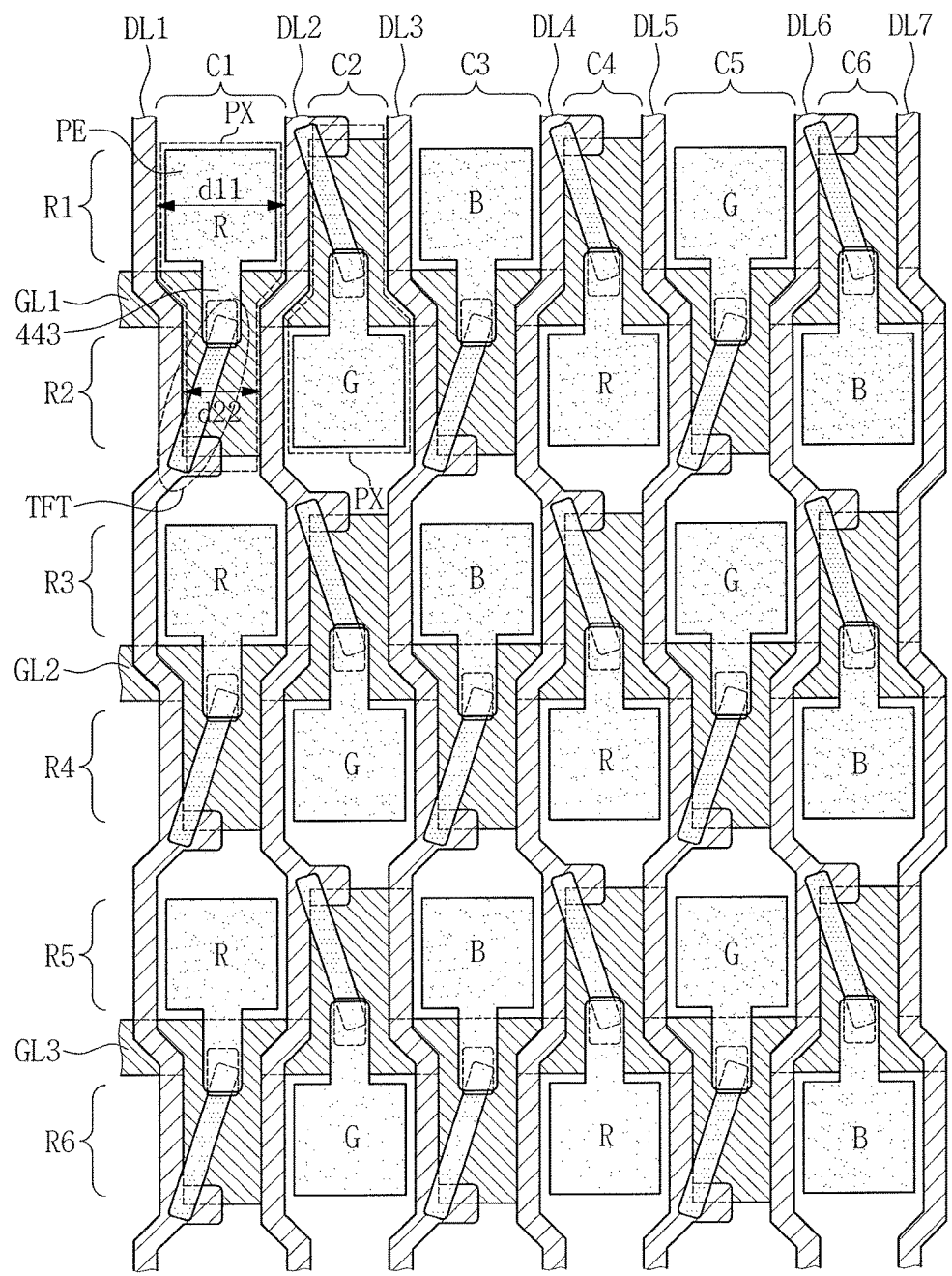
FIG. 9 illustrates yet another embodiment of a plurality of pixels included in an LCD device, each of which has the structure of FIG. 1.

FIG. 9 illustrates yet another embodiment of a plurality of pixels PX included in an LCD device, each of which has the structure of FIG. 1.

Referring to FIG. 9, in an exemplary embodiment, each of the plurality of pixels PX has substantially the same structure as that of the pixel PX illustrated in FIG. 1. In such an exemplary embodiment, each of the pixels PX illustrated in FIG. 9 has substantially the same planar and cross-sectional structure as that of the pixel PX illustrated in FIG. 1.

As illustrated in FIG. 9, in an exemplary embodiment, an interval d11 along the second direction between data lines DL1 and DL2 at opposite sides of a pixel electrode PE is greater than an interval d22 along the second direction between data lines DL1 and DL2 at opposite sides of a switching element TFT. Accordingly, each of data lines DL1, DL2, DL3, DL4, DL5, DL6, and DL7 has a zigzag shape.

The LCD device illustrated in FIG. 9 is substantially the same as that of FIG. 8, other than the shape of the data line, and thus, descriptions of the components illustrated in FIG. 9 will make reference to FIG. 8 and related descriptions.

Figure 10:
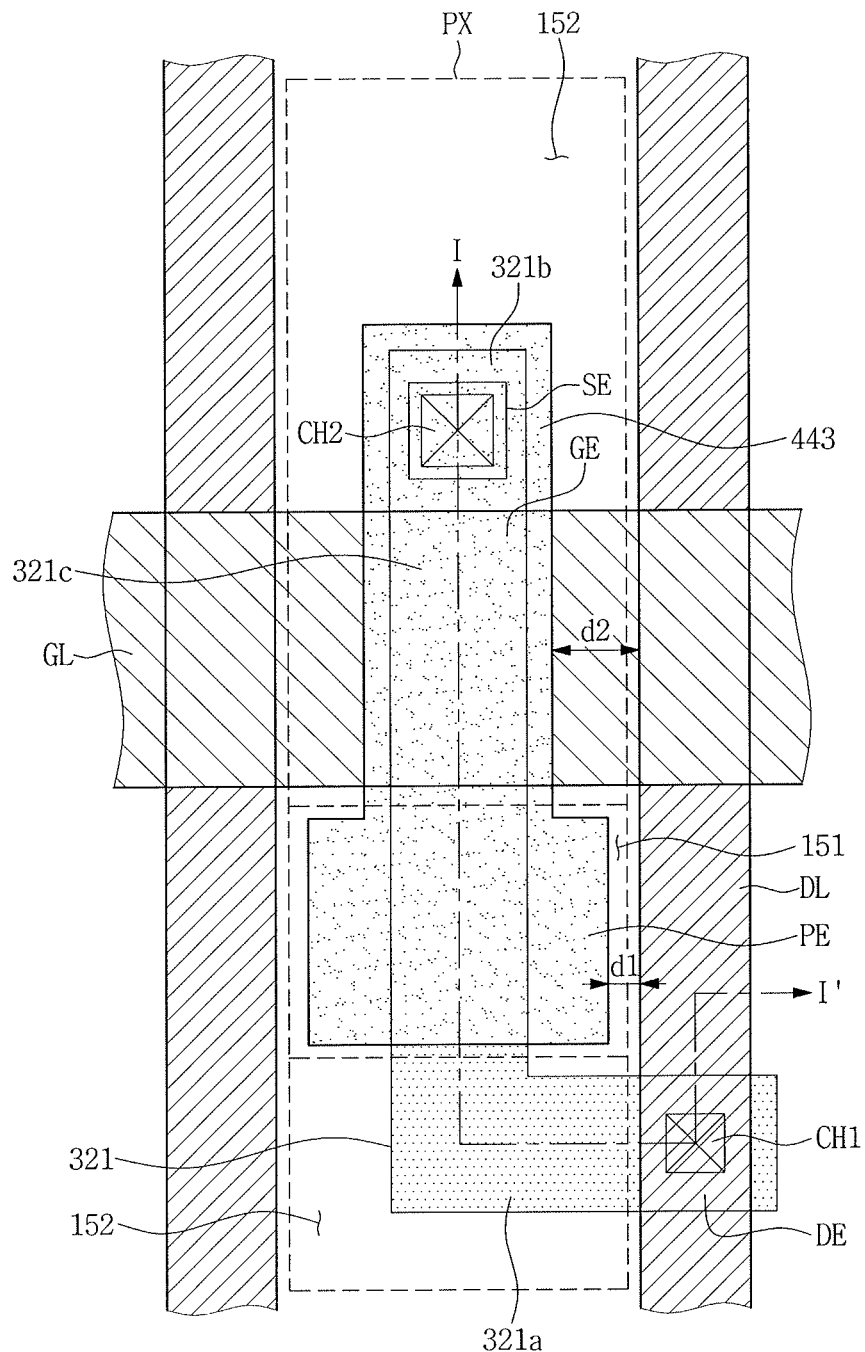
FIG. 10 illustrates a plan view of another embodiment of a pixel.
Figure 11:
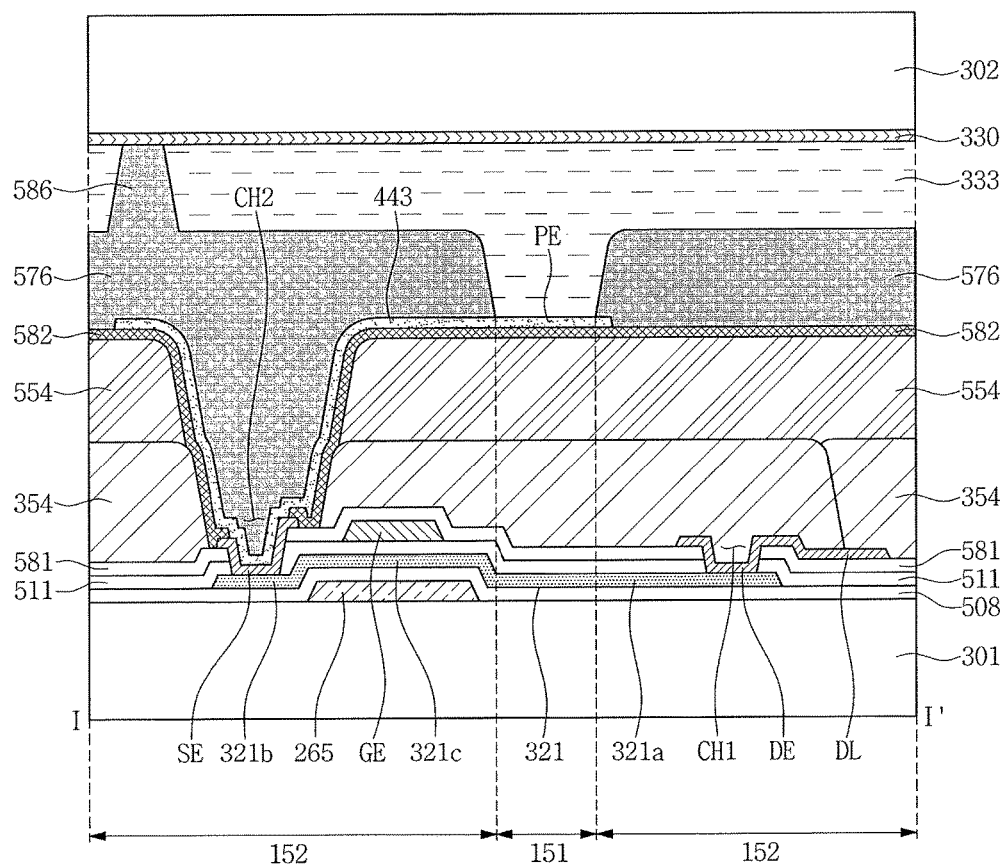
FIG. 11 illustrates a cross-sectional view taken along line I-I' of FIG. 10.

FIG. 10 illustrates a plan view of another embodiment of a pixel PX; and FIG. 11 illustrates a cross-sectional view taken along line I-I' of FIG. 10.

As illustrated in FIGS. 10 and 11, the pixel PX includes a first substrate 301, a switching element TFT, a light shielding layer 265, a buffer layer 508, a semiconductor layer 321, a gate insulating layer 511, a passivation layer 581, a color filter 354, an organic layer 554, a capping layer 582, a connecting electrode 443, a pixel electrode PE, a light blocking layer 576, a column spacer 586, a liquid crystal layer 333, a second substrate 302, and a common electrode 330.

The pixel electrode PE is disposed in a pixel area 151 of the pixel PX, and the switching element TFT is disposed in a non-pixel area 152 of the pixel PX. The pixel area 151 is smaller than the non-pixel area 152. For example, a ratio of the pixel area 151 to the non-pixel area 152 may be about 3:7.

In an exemplary embodiment, the switching element TFT is connected to a gate line GL, a data line DL, and the pixel electrode PE. In such an exemplary embodiment, the switching element TFT includes a gate electrode GE connected to the gate line GL, a drain electrode DE connected to the data line DL, a source electrode SE connected to the pixel electrode PE, and a semiconductor layer 321 connected to the drain electrode DE and the source electrode SE.

The semiconductor layer 321 includes a drain area 321a, a source area 321b, and a channel area 321c. As illustrated in the plan view of FIG. 10, the channel area 321c is positioned between the drain area 321a and the source area 321b. In addition, as illustrated in the cross-sectional view of FIG. 11, the channel area 321c is positioned between the gate electrode GE and the light shielding layer 265. The drain area 321a is connected to the drain electrode DE, and the source area 321b is connected to the source electrode SE.

The switching element TFT may include a thin film transistor.

The switching element TFT, the light shielding layer 265, the buffer layer 508, the semiconductor layer 321, the gate insulating layer 511, the passivation layer 581, the drain electrode DE, the source electrode SE, the color filter 354, the organic layer 554, the capping layer 582, the connecting electrode 443, the pixel electrode PE, the light blocking layer 576, and the column spacer 586 may be disposed on the first substrate 301.

The common electrode 330 may be disposed on the second substrate 302. Alternatively, the light blocking layer 576 and the column spacer 586 may be disposed on the second substrate 302, i.e., the light blocking layer 576 may be disposed between the second substrate 302 and the common electrode 330.

The light shielding layer 265 may be disposed on the first substrate 301. Light provided from a backlight of the LCD device may be applied to the channel area 321c of the semiconductor layer 321 through the first substrate 301. In such an exemplary embodiment, the channel area 321c of the semiconductor layer 321 is activated such that a photo-leakage current may occur. The light shielding layer 265 prevents light provided from the backlight from reaching the channel area 321c of the semiconductor layer 321 to suppress generation of the photo-leakage current. The light shielding layer 265 may include or be formed of a material such as metal. Alternatively, the light shielding layer 265 may extend further toward the non-pixel area 152 in which the source electrode SE is disposed and the source contact hole CH2 is defined, thus overlapping the source electrode SE and the source contact hole CH2.

The buffer layer 508 may be disposed on the light shielding layer 265 and the first substrate 301. The buffer layer 508 may be disposed on substantially the entire surface of the first substrate 301 on which the light shielding layer 265 is disposed.

The buffer layer 508 may include silicon nitride ($SiN_x$), silicon oxide ($SiO_x$), or the like. The buffer layer 508 may have a multilayer structure including at least two insulating layers having different physical properties.

The semiconductor layer 321 may be disposed on the buffer layer 508. The semiconductor layer 321 includes the drain area 321a, the source area 321b, and the channel area 321c, and the channel area 321c overlaps the light shielding layer 265.

The semiconductor layer 321 may include indium gallium zinc oxide (IGZO) or amorphous indium gallium zinc oxide (a-IGZO). In addition, each of the drain area 321a and the source area 321b of the semiconductor layer 321 includes impurities. The impurities may be hydrogen ($H_2$). The indium gallium zinc oxide (IGZO) has a high degree of transparency, and exhibits a high degree of electric conductivity through injection of the impurities such as hydrogen ($H_2$). That is, when hydrogen ($H_2$) is injected to the indium gallium zinc oxide (IGZO), a density of electrons that increases the electric conductivity of the indium gallium zinc oxide (IGZO) increases. In addition, even though the impurities such as hydrogen ($H_2$) are injected, inherent transparency of the indium gallium zinc oxide (IGZO) is not degraded. Accordingly, although the source area 321b of the semiconductor layer 321 is positioned in the pixel area 151, the transmittance of the pixel area 151 is not substantially reduced.

In an alternative exemplary embodiment, the semiconductor layer 321 may include amorphous silicon or polycrystalline silicon. In an exemplary embodiment, the semiconductor layer 321 of FIG. 11 may include the same material as the material included in the semiconductor layer 321 of FIG. 2. In an alternative exemplary embodiment, the semiconductor layer 321 of FIG. 2 may include the same material as the material included in the semiconductor layer 321 of FIG. 11.

As illustrated in FIG. 11, the gate insulating layer 511 is disposed on the semiconductor layer 321 and the buffer layer 508. The gate insulating layer 511 may be disposed on substantially the entire surface of the first substrate 301 on which the semiconductor layer 321 and the buffer layer 508 are disposed. A drain contact hole CH1 is defined in the gate insulating layer 511 to correspond to the drain area 321a, and a source contact hole CH2 is defined in the gate insulating layer 511 to correspond to the source area 321b.

The gate insulating layer 511 may include silicon nitride ($SiN_x$), silicon oxide ($SiO_x$), or the like. The gate insulating layer 511 may have a multilayer structure including at least two insulating layers having different physical properties.

The gate line GL and the gate electrode GE are disposed on the gate insulating layer 511. In such an exemplary embodiment, the gate electrode GE overlaps the channel area 321c of the semiconductor layer 321. Accordingly, the channel area 321c is positioned between the gate electrode GE and the light shielding layer 265.

In an exemplary embodiment, although not illustrated, the gate insulating layer 511 may have the same shape as a shape of the gate line GL and the gate electrode GE. For example, in a case in which a configuration including the gate line GL and the gate electrode GE is defined as a gate transmission unit, the insulating interlayer 511 may have the same shape as a shape of the gate transmission unit.

The gate line GL includes a plurality of gate electrodes GE. In an exemplary embodiment, although not illustrated, the gate line GL may have a connecting portion, e.g., an end portion thereof, that is wider than another portion thereof, to be connected to another layer or an external driving circuit.

The gate line GL may include or be formed of aluminum (Al) or alloys thereof, silver (Ag) or alloys thereof, copper (Cu) or alloys thereof, and/or molybdenum (Mo) or alloys thereof. In an alternative exemplary embodiment, the gate line GL may include or be formed of one of chromium (Cr), tantalum (Ta), and titanium (Ti). In an exemplary embodiment, the gate line GL may have a multilayer structure including at least two conductive layers that have different physical properties from one another.

The gate electrode GE may include the same material and have the same structure (a multilayer structure) as those of the gate line GL. The gate electrode GE and the gate line GL may be simultaneously formed in the same process.

As illustrated in FIG. 11, the passivation layer 581 is disposed on the gate insulating layer 511 and the gate electrode GE. Although not illustrated, the passivation layer 581 may also be disposed on the gate line GL. The passivation layer 581 may be disposed on substantially the entire surface of the first substrate 301 on which the gate insulating layer 511, the gate electrode GE, and the gate line GL are disposed.

A drain contact hole CH1 is defined in the passivation layer 581 corresponding to the drain area 321a and a source contact hole CH2 is defined in the passivation layer 581 corresponding to the source area 321b.

The passivation layer 581 may include an inorganic insulating material such as silicon nitride ($SiN_x$) or silicon oxide ($SiO_x$), and in such an exemplary embodiment, an inorganic insulating material having photosensitivity and having a dielectric constant of about 4.0 may be used. In an alternative exemplary embodiment, the passivation layer 581 may have a double-layer structure including a lower inorganic layer and an upper organic layer. The passivation layer 581 may have a thickness greater than or equal to about 5000 Å, e.g., in a range of about 6000 Å to about 8000 Å.

As illustrated in FIGS. 10 and 11, the drain electrode DE is disposed in the drain area 321a of the semiconductor layer 321. The drain electrode DE is connected to the drain area 321a through the drain contact hole CH1. In an exemplary embodiment, the drain electrode DE may further be disposed on the passivation layer 581.

The drain electrode DE may include or be formed of refractory metal, such as molybdenum, chromium, tantalum and titanium, or an alloy thereof. The drain electrode DE may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative exemplary embodiment, the drain electrode DE may include or be formed of any suitable metals or conductors rather than the aforementioned materials.

The data line DL is disposed on the passivation layer 581. The data line DL and the drain electrode DE may be unitary. The data line DL may include the same material as a material included in the drain electrode DE.

As illustrated in FIGS. 10 and 11, the source electrode SE is disposed in the source area 321b of the semiconductor layer 321. The source electrode SE is connected to the source area 321b through the source contact hole CH2. In an exemplary embodiment, the source electrode SE may further be disposed on the passivation layer 581. The source electrode SE may include the same material as a material included in the drain electrode DE.

As illustrated in FIG. 11, the color filter 354 is disposed on the passivation layer 581 and the drain electrode DE. An edge of the color filter 354 may be disposed on the data line DL. However, the color filter 354 may be absent at a position corresponding to the source contact hole CH2. In another exemplary embodiment, an edge of one of the color filters 354 may overlap an edge of an adjacent one of the color filters 354. The color filter 354 may include a photosensitive organic material.

The organic layer 554 may be disposed on the color filter 354. The organic layer 554 may include a photosensitive organic material that has a low dielectric constant. For example, the organic layer 554 may include a photosensitive organic material that has a lower dielectric constant than a dielectric constant of the passivation layer 581.

The capping layer 582 may be disposed on the organic layer 554, the color filter 354, the passivation layer 581, and the source electrode SE. A source contact hole CH2 is defined in the capping layer 582, corresponding to the source area 321b. The capping layer 582 may include silicon nitride ($SiN_x$), silicon oxide ($SiO_x$), or the like.

As illustrated in FIGS. 10 and 11, the pixel electrode PE is disposed on the capping layer 582 and in the pixel area 151. The pixel electrode PE may include or be formed of a transparent conductive material, such as indium tin oxide ("ITO") or indium zinc oxide ("IZO"). Herein, ITO may be a polycrystalline or monocrystalline material, and IZO may be a polycrystalline or monocrystalline material, as well. In an alternative exemplary embodiment, IZO may be an amorphous material.

The connecting electrode 443 may be disposed on the capping layer 582. The connecting electrode 443 extends from the pixel electrode PE to the non-pixel area 152. The connecting electrode 443 and the pixel electrode PE may be unitary. The connecting electrode 443 may have a smaller planar area than a planar area of the pixel electrode PE. The connecting electrode 443 is disposed in the pixel area 151 and the non-pixel area 152. The connecting electrode 443 is connected to the source electrode SE through the source contact hole CH2 of the capping layer 582.

The connecting electrode 443 may include the same material as a material included in the pixel electrode PE. The connecting electrode 443 and the pixel electrode PE may be simultaneously formed in the same process. Alternatively, the connecting electrode 443 may include the same material as a material included in the source electrode SE. For example, the connecting electrode 443 and the source electrode SE may be unitary. In such an exemplary embodiment, the connecting electrode 443 and the source electrode SE may be simultaneously formed in the same process. In such an exemplary embodiment, the connecting electrode 443 is connected to the pixel electrode PE through a separate contact hole.

An interval along the second direction between the pixel electrode PE and the data line DL is smaller than an interval along the second direction between the connecting electrode 443 and the data line DL. For example, in FIG. 10, a distance between a data line DL (a right one of the two data lines DL) connected to a pixel PX and a pixel electrode PE of the pixel PX is defined as a distance d1, and a distance between the data line DL and the connecting electrode 443 of the pixel PX is defined as a distance d2, the distance d1 is smaller than the distance d2.

As illustrated in FIG. 11, the light blocking layer 576 is disposed on the connecting electrode 443, the pixel electrode PE, and the capping layer 582. The light blocking layer 576 may be disposed at a position substantially other than an area corresponding to the pixel area 151.

As illustrated in FIG. 11, the column spacer 586 is disposed on the light blocking layer 576. The column spacer 586 and the light blocking layer 576 may be unitary.

The common electrode 330 may be disposed on the second substrate 302. The common electrode 330 may be disposed on substantially the entire surface of the second substrate 302. In an alternative exemplary embodiment, the common electrode 330 may be disposed on the second substrate 302, corresponding to the pixel area 151. A common voltage is applied to the common electrode 330.

In an exemplary embodiment, although not illustrated, the pixel PX may further include a first polarizer and a second polarizer. When a surface of the first substrate 301 and a surface of the second substrate 302 that face each other are defined as upper surfaces of the corresponding substrates, respectively, and surfaces opposite to the upper surfaces are defined as lower surfaces of the corresponding substrates, respectively, the aforementioned first polarizer is disposed on the lower surface of the first substrate 301, and the second polarizer is disposed on the lower surface of the second substrate 302.

A transmission axis of the first polarizer is perpendicular to a transmission axis of the second polarizer, and one of the transmission axes thereof is oriented parallel to the gate line GL. In an alternative exemplary embodiment, the LCD device may include only one of the first polarizer and the second polarizer.

The first substrate 301 and the second substrate 302 are insulating substrates that include or are formed of glass or plastic.

The liquid crystal layer 333 between the first substrate 301 and the second substrate 302 include liquid crystal molecules. The liquid crystal molecules may be twisted nematic liquid crystals.

Figure 12:
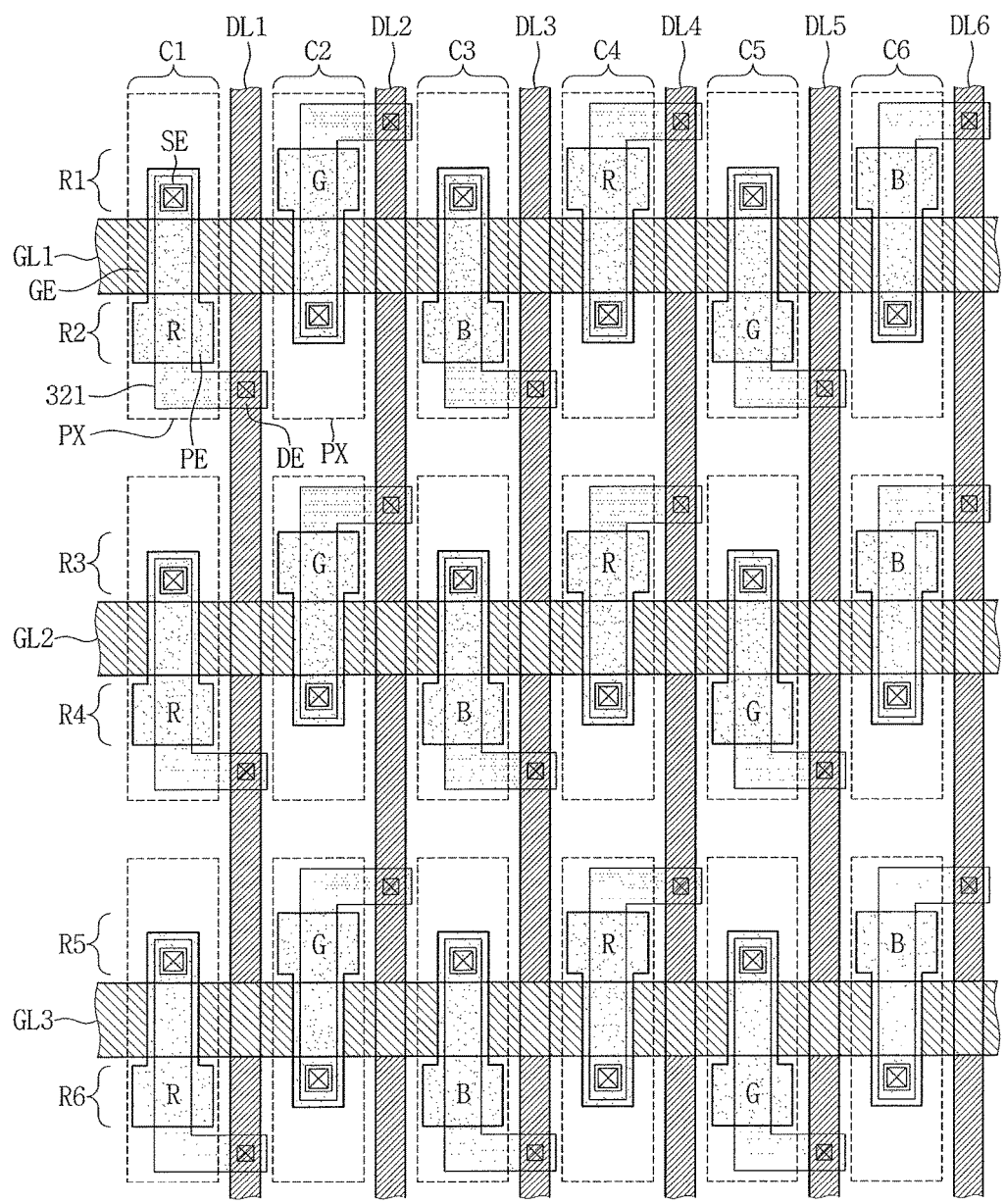
FIG. 12 illustrates an embodiment of a plurality of pixels included in an LCD device, each of which has the structure of FIG. 10.

FIG. 12 illustrates an embodiment of a plurality of pixels PX included in an LCD device, each of which has the structure of FIG. 10.

Each of the plurality of pixels PX illustrated in FIG. 12 has the same structure as the structure of the pixel PX illustrated in FIG. 10. That is, each of the pixels PX illustrated in FIG. 12 has substantially the same planar and cross-sectional structure as that of the pixel PX illustrated in FIG. 10.

The shapes of a plurality of pixels PX in one column may be inverse to the shapes of a plurality of pixels PX in another column, respectively, i.e., may be rotated by 180 degrees. As illustrated in FIG. 12, in an exemplary embodiment, the shapes of pixels PX in one of even-numbered columns C2, C4, and C6 may be inverse to the shapes of pixels PX in one of odd-numbered columns C1, C3, and C5, respectively. In such an exemplary embodiment, the shapes of the pixels PX in the odd-numbered column may be the same as the shapes of the pixels PX illustrated in FIG. 10, respectively, and the shapes of the pixels PX in the even-numbered column may be rotated 180 degrees with respect to the shapes of the pixels PX illustrated in FIG. 10, respectively.

Accordingly, a switching element TFT connected to a pixel electrode PE in a 2k-th row is disposed between two pixel electrodes PE in a (2k−1)-th row and adjacent to the pixel electrode PE in the 2k-th row. As illustrated in FIG. 12, in an exemplary embodiment, when a pixel electrode PE in a second row R2 and the second column C2 is defined as a first pixel electrode, a pixel electrode PE in a first row R1 and the first column C1 is defined as a second pixel electrode, and a pixel electrode PE in the first row R1 and the third column C3 is defined as a third pixel electrode, a switching element TFT connected to the first pixel electrode is disposed between the second pixel electrode and the third pixel electrode.

Switching elements TFT respectively connected to pixel electrodes PE in the (2k−1)-th row and switching elements TFT respectively connected to pixel electrodes PE in the 2k-th row are connected to one gate line GL in common. As illustrated in FIG. 12, in an exemplary embodiment, switching elements TFT respectively connected to pixel electrodes PE in the first row R1 and switching elements TFT respectively connected to pixel electrodes PE in the second row R2 are connected to a first gate line GL1 in common. In an exemplary embodiment, the first gate line GL1 includes a plurality of gate electrodes GE which are connected to one another. In such an exemplary embodiment, odd-numbered gate electrodes GE are connected to the switching elements TFT for driving the pixel electrodes PE in the first row R1, respectively, and even-numbered gate electrodes GE are connected to the switching elements TFT for driving the pixel electrodes PE in the second row R2, respectively.

In an exemplary embodiment, pixel electrodes PE in one of odd-numbered rows R1, R3, and R5 are disposed in the even-numbered columns C2, C4, and, C6, respectively. In such an exemplary embodiment, the pixel electrodes PE in the odd-numbered row are disposed between a (2x−1)-th data line ("x" being a natural number) and a 2x-th data line. As illustrated in FIG. 12, in an exemplary embodiment, the pixel electrodes PE in the first row R1 are disposed in the second column C2, the fourth column C4, and the sixth column C6, respectively. In other words, the pixel electrodes PE in the first row R1 are disposed between the first data line DL1 and the second data line DL2, between the third data line DL3 and the fourth data line DL4, and between the fifth data line DL5 and the sixth data line DL6.

In an exemplary embodiment, pixel electrodes PE in one of even-numbered rows R2, R4, and R6 are disposed in the odd-numbered columns C1, C3, and, C5, respectively. In such an exemplary embodiment, the pixel electrodes PE in the even-numbered row are disposed between the 2x-th data line and a (2x+1)-th data line. As illustrated in FIG. 12, in an exemplary embodiment, the pixel electrodes PE in the second row R2 are disposed in the first column C1, the third column C3, and the fifth column C5, respectively. In other words, the pixel electrodes PE in the second row R2 are disposed between the second data line DL2 and the third data line DL3, between the fourth data line DL4 and the fifth data line DL5, and between the sixth data line DL6 and the seventh data line. In such an exemplary embodiment, however, an outermost one of the pixel electrodes PE in the even-numbered row is disposed between the first data line DL1 and an edge of the first substrate 301.

Alternatively, the pixel electrodes PE in one of the odd-numbered rows R1, R3, and R5 may be disposed in the odd-numbered columns C1, C3, and C5, respectively, and the pixel electrodes PE in one of the even-numbered rows R2, R4, and R6 may be disposed in the even-numbered columns C2, C4, and C6, respectively. In such an exemplary embodiment, the pixel electrodes PE in the odd-numbered row may be disposed between the 2x-th data line and the (2x+1)-th data line, and the pixel electrodes PE in the even-numbered row may be disposed between the (2x−1)-th data line and the 2x-th data line.

Each of the pixels PX is connected to one of respective data lines DL at opposite sides of the pixel PX. As illustrated in FIG. 12, in an exemplary embodiment, for example, each of the pixels PX may be connected to a right one of the respective data lines DL at the opposite sides of the pixel PX. The pixel PX is connected to the data line DL through the switching element TFT.

A pixel electrode PE in one of two adjacent rows is not disposed between two adjacent pixel electrodes PE in the other row. As illustrated in FIG. 12, in an exemplary embodiment, when the pixel electrode PE in the second row R2 and the fifth column C5 is defined as a first pixel electrode, a pixel electrode PE in the first row R1 and the fourth column C4 is defined as a second pixel electrode, and a pixel electrode PE in the third row R3 and the fourth column C4 is defined as a third pixel electrode, no portion of the first pixel electrode is disposed between the second pixel electrode and the third pixel electrode.

As such, adjacent ones of the pixel electrodes PE are diagonally adjacent to one another, and a pixel electrode in one of two adjacent rows is not disposed between two adjacent pixel electrodes in the other row. Thus, a distance between adjacent ones of the pixel electrodes in different rows may increase. Accordingly, an electric field and a liquid crystal molecular movement in one pixel may not interfere with an electric field and a liquid crystal molecular movement in an adjacent pixel.

In FIG. 12, a pixel PX that includes the pixel electrode PE denoted by "R" is a red pixel R displaying a red color; a pixel PX including the pixel electrode PE denoted by "G" is a green pixel G displaying a green color; and a pixel PX including the pixel electrode PE denoted by "B" is a blue pixel B displaying blue color. Three adjacent pixels PX connected to one gate line GL in common may collectively define a main pixel. As illustrated in FIG. 12, in an exemplary embodiment, a red pixel R, a green pixel G, and a blue pixel B connected to the first gate line GL1 in common and adjacent to one another may collectively define a main pixel.

Figure 13:
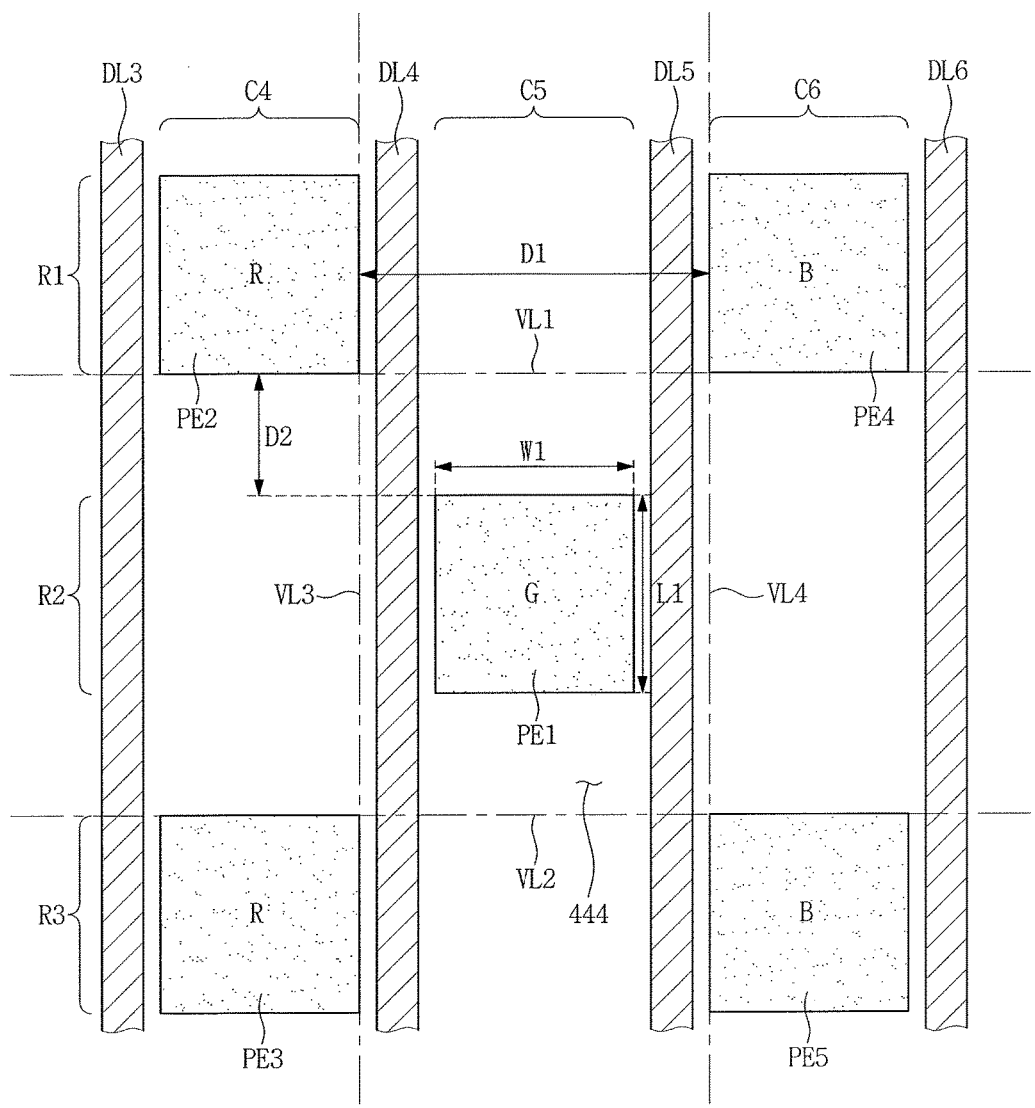
FIG. 13 illustrates an embodiment of a plurality of pixel electrodes in a predetermined area of FIG. 12.

In an exemplary embodiment, the first pixel electrode may be disposed in an area defined in a manner that will be described hereinbelow with reference to FIG. 13. FIG. 13 illustrates an embodiment of a plurality of pixel electrodes PE in a predetermined area of FIG. 12.

Referring to FIG. 13, in an exemplary embodiment, a pixel electrode PE in a second row R2 and a fifth column C5 is defined as a first pixel electrode PE1, and four pixel electrodes PE adjacent to the first pixel electrode PE1 and in two different rows are defined as second, third, fourth, and fifth pixel electrodes PE2, PE3, PE4, and PE5. In such an exemplary embodiment, a pixel electrode PE in a first row R1 and a fourth column C4 is defined as the second pixel electrode PE2, a pixel electrode PE in a third row R3 and the fourth column C4 is defined as the third pixel electrode PE3, a pixel electrode PE in the first row R1 and a sixth column C6 is defined as the fourth pixel electrode PE4, and a pixel electrode PE in the third row R3 and the sixth column C6 is defined as the fifth pixel electrode PE5.

In such an exemplary embodiment, an imaginary line extending from one (e.g., a side of the second pixel electrode PE2) of opposing sides of the second pixel electrode PE2 and the third pixel electrode PE3 is defined as a first line VL1, and an imaginary line extending from the other (e.g., a side of the third pixel electrode PE3) of the opposing sides of the second pixel electrode PE2 and the third pixel electrode PE3 is defined as a second line VL2. In addition, an imaginary line extending from one (e.g., a side of the second pixel electrode PE2) of opposing sides of the second pixel electrode PE2 and the fourth pixel electrode PE4 is defined as a third line VL3, and an imaginary line extending from the other (e.g., a side of the fourth pixel electrode PE4) of the opposing sides of the second pixel electrode PE2 and the fourth pixel electrode PE4 is defined as a fourth line VL4.

In an exemplary embodiment, the first pixel electrode PE1 is disposed between the first line VL1 and the second line VL2. In such an exemplary embodiment, the first pixel electrode PE1 is not disposed between the second pixel electrode PE2 and the third pixel electrode PE3. In such an exemplary embodiment, the first pixel electrode PE1 is not disposed between the fourth pixel electrode PE4 and the fifth pixel electrode PE5.

In an exemplary embodiment, the first pixel electrode PE1 may be disposed between the first line VL1 and the second line VL2, and between the third line VL3 and the fourth line VL4. In such an exemplary embodiment, the first pixel electrode PE1 may be disposed in an area 444 defined by the first, second, third, and fourth lines VL1, VL2, VL3, and VL4. In such an exemplary embodiment, the first pixel electrode PE1 is not disposed between the second pixel electrode PE2 and the fourth pixel electrode PE4. In addition, the first pixel electrode PE1 is not disposed between the third pixel electrode PE3 and the fifth pixel electrode PE5.

A width along the second direction of one pixel electrode PE in one of two adjacent rows may be less than a distance along the second direction between two pixel electrodes PE in columns adjacent to the one pixel electrode PE and in the other row. As illustrated in FIG. 13, in an exemplary embodiment, a width W1 of the first pixel electrode PE1 may be less than a distance D1 between the second pixel electrode PE2 and the third pixel electrode PE3.

Figure 14:
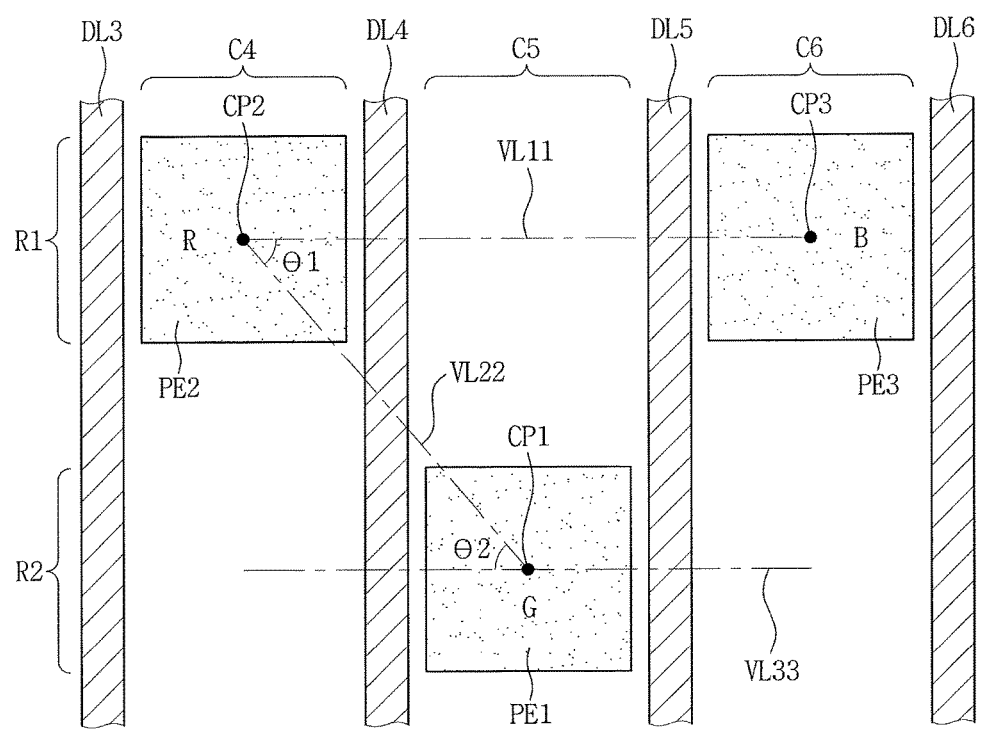
FIG. 14 illustrates an example of an angle between three adjacent pixel electrodes.

FIG. 14 illustrates an example of an angle between three adjacent pixel electrodes.

When a first line segment VL11 is an imaginary line segment connecting respective center points of two adjacent pixel electrodes PE in one row separated by a column is defined as a first line segment and second line segment VL22 is an imaginary line segment connecting a center point of a pixel electrode PE in another row and adjacent to the two pixel electrodes PE and one of the center points of the two pixel electrodes PE, an inner angle between the first line segment and the second line segment is in a range of about 50 degrees to about 55 degrees. Referring to FIG. 14, in an exemplary embodiment, an inner angle $\theta 1$ between the first line segment VL11 connecting a center point CP2 of a second pixel electrode PE2 and a center point CP3 of a third pixel electrode PE3 and the second line segment VL22 connecting the center point CP2 of the second pixel electrode PE2 and a center point CP1 of a first pixel electrode PE1 may be in a range of about 50 degrees to about 55 degrees, e.g., about 52 degrees.

In an exemplary embodiment, an inner angle $\theta 2$ between the second line segment VL22 and an imaginary line VL33 that passes through the center point CP1 of the first pixel electrode PE1 extending along the second direction to perpendicularly intersects the data line DL (e.g., a third data line DL3) may be in a range of about 50 degrees to about 55 degrees, e.g., about 52 degrees. When the first line segment VL11 is substantially parallel to the line VL33, $\theta 1$ and $\theta 2$ may be substantially equal.

FIG. 15 illustrates a plan view of the light blocking layer 576 of FIG. 11. As illustrated in FIG. 15, a plurality of apertures 576a are defined in the light blocking layer 576. A size of the aperture 576a may be less than or equal to the pixel area 151.

The apertures 576a are defined corresponding to the pixel electrode PE. Accordingly, apertures 576a in one of the odd-numbered rows R1, R3, and R5 are defined in the even-numbered columns C2, C4, and C6. In other words, the apertures 576a arranged along the odd-numbered rows are disposed between a (2x+1)-th data line ("x" being a natural number) and a 2x-th data line, respectively. As illustrated in FIG. 15, in an exemplary embodiment, the apertures 576a in the first row R1 are defined in the second column C2, the fourth column C4, and the sixth column C6. In other words, the apertures 576a arranged along the first row R1 are defined between the first data line DL1 and the second data line DL2, between the third data line DL3 and the fourth data line DL4, and between the fifth data line DL5 and the sixth data line DL6.

Apertures 576a in one of the even-numbered rows R2, R4, and R6 are defined in the odd-numbered columns C1, C3, and C5. In other words, the apertures 576a arranged along the even-numbered rows are defined between a 2x-th data line and a (2x+1)-th data line. As illustrated in FIG. 15, in an exemplary embodiment, the apertures 576a in the second row R2 are defined in each of the first column C1, the third column C3, and the fifth column C5. In other words, the apertures 576a arranged along the second row R2 are defined between the second data line DL2 and the third data line DL3, between the fourth data line DL4 and the fifth data line DL5, and between the sixth data line DL6 and the seventh data line DL7. However, an outermost one of the apertures 576a in the even-numbered row is disposed between the first data line DL1 and an edge of the first substrate 301.

Alternatively, the apertures 576a in one of the odd-numbered rows R1, R3, and R5 may be defined in the odd-numbered columns C1, C3, and C5, and the apertures 576a in one of the even-numbered rows R2, R4, and R6 may be defined in the even-numbered columns C2, C4, and C6. In such an exemplary embodiment, the apertures 576a arranged along the odd-numbered row are defined between the 2x-th data line and the (2x+1)-th data line, and the apertures 576a arranged along the even-numbered row are defined between the (2x−1)-th data line and the 2x-th data line.

An aperture 576a in one of two adjacent rows is not defined between two adjacent apertures 576a in the other row. As illustrated in FIG. 15, in an exemplary embodiment, when an aperture in the second row R2 and the fifth column C5 is defined as a first aperture, an aperture in the first row R1 and the fourth column C4 is defined as a second aperture, and an aperture in the third row R3 and the fourth column C4 is defined as a third aperture, no portion of the first aperture is defined between the second aperture and the third aperture.

In an exemplary embodiment, the light blocking layer 376 of FIG. 2 may have substantially the same structure as that of the light blocking layer 576 of FIG. 15. For example, the light blocking layer 376, as illustrated in FIG. 15, may include a plurality of apertures 576a. In such an exemplary embodiment, a size of the aperture 576a of the light blocking layer 376 may be less than or equal to the pixel area 151. The apertures 576a of the light blocking layer 376 may be defined corresponding to the pixel electrode PE. In an exemplary embodiment, the light blocking layer 376 and the color filter 354 of FIG. 2 may be disposed on the first substrate 301 as illustrated in FIG. 10.

In accordance with one or more of the aforementioned embodiments, pixels of an LCD device are diagonally adjacent to one another. In such exemplary embodiments, a pixel electrode in one of two adjacent rows is not disposed between two adjacent pixel electrodes in the other row. Accordingly, a distance between adjacent pixel electrodes in different rows may increase. Thus, interference between electric fields and interference between liquid crystal molecular movements in adjacent pixels may be significantly reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:
1. A liquid crystal display device, comprising:
a liquid crystal layer between a first substrate and a second substrate;
a plurality of gate lines and a plurality of data lines on the first substrate, the data lines crossing a plurality of rows; and
a plurality of pixels connected to the plurality of gate lines and the plurality of data lines, the plurality of pixels including a pixel electrode and a switching element connected to the pixel electrode, wherein
pixel electrodes in one of an odd-numbered row and an even-numbered row are in odd-numbered columns, respectively,
pixel electrodes in the other of the odd-numbered row and the even numbered row are in even-numbered columns, respectively,
one pixel electrode in a first row of two adjacent rows is connected to one switching element,
at least one portions of the one switching element is between two adjacent pixel electrodes in a second row of the two adjacent rows,
the one switching element includes a gate electrode connected to one of the gate lines, and
a size of the one pixel electrode is less than a size of the gate electrode.

2. The liquid crystal display device as claimed in claim 1, wherein a pixel electrode in one row is not between pixel electrodes in an adjacent row.

3. The liquid crystal display device as claimed in claim 2, wherein the pixel electrodes include a first pixel electrode in one row, a second pixel electrode in another row and adjacent to the first pixel electrode, and a third pixel electrode in still another row, the third pixel electrode being adjacent to the first pixel electrode and opposing the second pixel electrode, and wherein the first pixel electrode is between imaginary lines extending from opposing sides of the second pixel electrode and the third pixel electrode, respectively.

4. The liquid crystal display device as claimed in claim 3, wherein the pixel electrodes include a fourth pixel electrode adjacent to the first pixel electrode and the second pixel electrode and in the another row, and wherein the first pixel electrode is between imaginary lines extending from opposing sides of the second pixel electrode and the fourth pixel electrode, respectively.

5. The liquid crystal display device as claimed in claim 1, wherein switching elements respectively connected to pixel electrodes in a (2k−1)-th row (k being a natural number) and switching elements respectively connected to pixel electrodes in a 2k-th row are connected to one gate line in common.

6. The liquid crystal display device as claimed in claim 1, wherein a switching element connected to a pixel electrode in a 2k-th row is between two pixel electrodes in a (2k+1)-th row and adjacent to the pixel electrode in the 2k-th row.

7. The liquid crystal display device as claimed in claim 1, wherein a switching element connected to a pixel electrode in a 2k-th row is between two pixel electrodes in a (2k−1)-th row and adjacent to the pixel electrode in the 2k-th row.

8. The liquid crystal display device as claimed in claim 1, wherein a portion of a pixel electrode in one row is between a pixel electrode in another row adjacent to the one row and a pixel electrode in still another row adjacent to the one row.

9. The liquid crystal display device as claimed in claim 8, wherein the pixel electrode in the another row and the pixel electrode in the still another row are in the same column.

10. The liquid crystal display device as claimed in claim 1, wherein an inner angle between a first imaginary line segment connecting respective center points of two adjacent pixel electrodes in one row and a second imaginary line segment connecting a center point of a pixel electrode in another row and adjacent to the two pixel electrodes and one of the center points of the two pixel electrodes is in a range of about 50 degrees to about 55 degrees.

11. The liquid crystal display device as claimed in claim 1, wherein an interval between data lines at opposite sides of the pixel electrode is greater than an interval between data lines at opposite sides of the switching element.

12. The liquid crystal display device as claimed in claim 1, wherein each of the gate lines has a zigzag shape.

13. The liquid crystal display device as claimed in claim 12, wherein each of the data lines has a linear shape or a zigzag shape.

14. The liquid crystal display device as claimed in claim 1, wherein:
the pixel electrode is in a pixel area of each of the pixels,
the switching element is in a non-pixel area of each of the pixels, and
a ratio of the pixel area to the non-pixel area is about 3:7.

15. The liquid crystal display device as claimed in claim 1, wherein two adjacent pixels in one row and one pixel adjacent to the two pixels and in another row display different colors from one another.

16. The liquid crystal display device as claimed in claim 15, wherein the three pixels are connected to one gate line in common.

17. The liquid crystal display device as claimed in claim 1, wherein the one switching element further includes a drain electrode connected to one of data lines, and a source electrode connected to the one pixel electrode; and the pixel electrode the drain electrode.

18. The liquid crystal display device as claimed in claim 17, further comprising a connecting electrode connecting the one pixel electrode and the source electrode.

19. The liquid crystal display device as claimed in claim 18, wherein the connecting electrode overlaps the gate electrode, the drain electrode, and the source electrode.

20. The liquid crystal display device as claimed in claim 18, wherein an interval between the one pixel electrode and the one of the data lines is less than an interval between the connecting electrode and the one of the data lines.

21. The liquid crystal display device as claimed in claim 17, further comprising a light blocking layer defined with apertures, the apertures defined corresponding to the pixel electrodes.

22. The liquid crystal display device as claimed in claim 21, wherein the pixel electrodes and the light blocking layer are on the first substrate.

23. The liquid crystal display device as claimed in claim 21, further comprising a color filter disposed corresponding to the aperture of the light blocking layer.

24. The liquid crystal display device as claimed in claim 17, wherein:
the one switching element further includes a semiconductor layer, and
the semiconductor layer includes indium gallium zinc oxide (IGZO) or amorphous indium gallium zinc oxide (a-IGZO).

25. A liquid crystal display device, comprising:
a liquid crystal layer between a first substrate and a second substrate;
a plurality of gate lines and a plurality of data lines; and
a plurality of pixels connected to the plurality of gate lines and the plurality of data lines, each of the plurality of pixels including a pixel electrode and a switching element directly connected to the pixel electrode, the plurality of pixels being arranged in a matrix along a first direction and a second direction crossing the first direction, wherein adjacent pixel electrodes in the second direction are offset from one another in the first direction and a width of one pixel electrode in one of two adjacent rows is greater than a distance between two adjacent pixel electrodes in the other row and is greater than a length of the one pixel electrode along the first direction.

26. The liquid crystal display device as claimed in claim 25, wherein adjacent pixel electrodes in the second direction do not overlap one another.

27. The liquid crystal display device as claimed in claim 25, wherein adjacent pixel electrodes in the second direction have inverted structures.

* * * * *